US009869913B2

(12) United States Patent
Yoshida et al.

(10) Patent No.: US 9,869,913 B2
(45) Date of Patent: Jan. 16, 2018

(54) ACTIVE MATRIX SUBSTRATE AND DISPLAY DEVICE

(71) Applicant: SHARP KABUSHIKI KAISHA, Sakai, Osaka (JP)

(72) Inventors: Masahiro Yoshida, Sakai (JP); Isao Ogasawara, Sakai (JP); Yasuhiro Mimura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/312,004

(22) PCT Filed: May 18, 2015

(86) PCT No.: PCT/JP2015/064153
§ 371 (c)(1),
(2) Date: Nov. 17, 2016

(87) PCT Pub. No.: WO2015/178334
PCT Pub. Date: Nov. 26, 2015

(65) Prior Publication Data
US 2017/0123249 A1  May 4, 2017

(30) Foreign Application Priority Data

May 22, 2014 (JP) .................................. 2014-105833

(51) Int. Cl.
*G02F 1/1365* (2006.01)
*G02F 1/1362* (2006.01)
(Continued)

(52) U.S. Cl.
CPC ...... *G02F 1/136259* (2013.01); *G02F 1/1368* (2013.01); *G02F 1/13452* (2013.01);
(Continued)

(58) Field of Classification Search
CPC ............. G02F 1/1368; G02F 1/136204; G02F 1/136259; G02F 1/134286; G02F 1/13452; G02F 2001/136254
See application file for complete search history.

(56) References Cited

U.S. PATENT DOCUMENTS 7,847,577 B2 * 12/2010 Yoshida ................. G09G 3/006
324/760.02
9,524,683 B2 * 12/2016 Fujikawa ............ G02F 1/13454
(Continued)

FOREIGN PATENT DOCUMENTS

WO  WO 2009/113669  9/2009

OTHER PUBLICATIONS

International Search Report for PCT/JP2015/064153 dated Jul. 7, 2015, 4 pages.
(Continued)

*Primary Examiner* — Dung Nguyen
(74) *Attorney, Agent, or Firm* — ScienBiziP, P.C.

(57) ABSTRACT

Inside of a region for inspection set outside a display region of an active matrix substrate, lead-out lines (27a to 27f) connected to data lines pass through in a column direction, and a control line for inspection (31) and six signal lines for inspection (32a to 32f) extend in a row direction. TFTs for inspection (51a to 51f) control a conduction state between the lead-out line and the corresponding signal line for inspection in accordance with a signal on the control line for inspection. Inside the region for inspection, three of the six signal lines for inspection are arranged on one side of the control line for inspection, and the remaining three are arranged on other side of the control line for inspection. One of the two adjacent lead-out lines is connected to one of the former signal lines for inspection via the TFT for inspection (51a, 51c, 51e), and the other is connected to one of the latter signal lines for inspection via the TFT for inspection (51b,
(Continued)

51*d*, 51*f*). This suppresses a disconnection, a leakage current, and a luminance unevenness of a screen for inspection.

16 Claims, 16 Drawing Sheets

(51) Int. Cl.
    *G02F 1/1368*    (2006.01)
    *G02F 1/1345*    (2006.01)

(52) U.S. Cl.
    CPC .. *G02F 1/136204* (2013.01); *G02F 1/136286* (2013.01); *G02F 1/136209* (2013.01); *G02F 2001/136254* (2013.01)

(56) References Cited

U.S. PATENT DOCUMENTS

| | | |
|---|---|---|
| 2011/0006780 A1 | 1/2011 | Tanimoto et al. |
| 2013/0063248 A1* | 3/2013 | Coutermarsh ........ E05B 47/026 340/5.73 |

OTHER PUBLICATIONS

Written Opinion of the ISA for PCT/JP2015/064153 dated Jul. 7, 2015, 3 pages.

* cited by examiner

ACTIVE MATRIX SUBSTRATE AND DISPLAY DEVICE

This application is the U.S. national phase of International Application No. PCT/JP2015/064153 filed May 18, 2015 which designated the U.S. and claims priority to JP Patent Application No. 2014-105833 filed May 22, 2014, the entire contents of each of which are hereby incorporated by reference.

TECHNICAL FIELD

The present invention relates to an active matrix substrate and a display device including the active matrix substrate.

BACKGROUND ART

A liquid crystal display device has been widely used as a thin, lightweight, low-power-consumption display device. A liquid crystal panel included in the liquid crystal display device has a structure in which an active matrix substrate and a counter substrate are stuck together, and a liquid crystal is enclosed between the two substrates. On the active matrix substrate, a plurality of scanning lines, a plurality of data lines, and a plurality of pixel circuits are formed. Moreover, as a method for reducing a size of the liquid crystal display device, there have been known a method for forming a scanning line drive circuit integrally with the active matrix substrate, and a method for mounting a data line drive circuit on the active matrix substrate.

In a manufacturing process of the liquid crystal panel, an inspection of the liquid crystal panel is conducted. The inspection of the liquid crystal panel is conducted, for example, by supplying signals for inspection from an outside to the liquid crystal panel that is a product in process or a finished product, and checking a screen for inspection displayed at that time. As to the inspection of the liquid crystal panel, for example, Patent Document 1 describes an active matrix substrate including four inspection wirings and a plurality of switching elements for inspection in order to detect a short circuit or a disconnection of scanning lines or the like.

PRIOR ART DOCUMENT

Patent Document

[Patent Document 1] International Publication No. WO 2009/113669

SUMMARY OF THE INVENTION

Problems to be Solved by the Invention

In a high-resolution and narrow picture-frame liquid crystal panel used for a smartphone, a tablet PC or the like, portions of lead-out lines connected to data lines may be formed alternately in two wiring layers. In this case, when signal lines for inspection the number of which is twice the number of basic colors assigned to pixel circuits (for example, six signal lines for inspection in a liquid crystal panel in an RGB method) are formed on an active matrix substrate, the inspection of the liquid crystal panel can be conducted easily with high accuracy. For example, a leakage current between the adjacent lead-out lines among the lead-out lines formed in the same wiring layer can be detected easily. However, when a lot of signal lines for inspection are formed on the active matrix substrate without any special device, there arises a problem that a disconnection or a leakage current occurs easily and a luminance unevenness occurs in the screen for inspection.

Therefore, an object of the present invention is to provide an active matrix substrate in which a disconnection, a leakage current, and a luminance unevenness of a screen for inspection are suppressed, and a display device including the active matrix substrate.

Means for Solving the Problems

According to a first aspect of the present invention, there is provided an active matrix substrate including: a plurality of pixel circuits arranged two-dimensionally inside a display region; a plurality of scanning lines extending in a first direction inside the display region; a plurality of data lines extending in a second direction inside the display region; a plurality of lead-out lines that is connected to the data line and that passes in the second direction through an inside of a circuit region set outside the display region; a control line extending in the first direction inside the circuit region; a plurality of signal lines extending in the first direction inside the circuit region; and a plurality of switching elements that is arranged inside the circuit region, and that controls a conduction state between the lead-out line and the signal line corresponding to the lead-out line in accordance with a signal on the control line, wherein the plurality of signal lines includes a first signal line arranged on one side of the control line inside the circuit region, and a second signal line arranged on other side of the control line inside the circuit region, and one of the two adjacent lead-out lines is connected to the first signal line via the switching element, and the other is connected to the second signal line via the switching element.

According to a second aspect of the present invention, in the first aspect of the present invention, the control line and the signal lines are formed in same wiring layer as the scanning lines, the lead-out line connected to the second signal line via the switching element is formed in same wiring layer as the data lines, and the lead-out line connected to the first signal line via the switching element has a portion formed in the same wiring layer as the scanning lines, and a portion formed in the same wiring layer as the data lines, and is formed in the same wiring layer as the data lines inside the circuit region.

According to a third aspect of the present invention, in the second aspect of the present invention, the lead-out lines are arranged in a fan shape in a fan-out region set on an opposite side of the display region with the circuit region interposed, and the lead-out line connected to the first signal line via the switching element is formed in the same wiring layer as the scanning lines inside the fan-out region.

According to a fourth aspect of the present invention, in the second aspect of the present invention, the lead-out lines are arranged in a fan shape in a fan-out region set between the display region and the circuit region, and the lead-out line connected to the first signal line via the switching element is formed in the same wiring layer as the scanning lines inside the fan-out region.

According to a fifth aspect of the present invention, in the first aspect of the present invention, the control line and the signal lines are formed in same wiring layer as the scanning lines, and the lead-out lines are formed in same wiring layer as the data lines.

According to a sixth aspect of the present invention, in the fifth aspect of the present invention, the lead-out lines are arranged in a fan shape in a fan-out region set between the display region and the circuit region.

According to a seventh aspect of the present invention, in the first aspect of the present invention, a number of the first signal lines and a number of the second signal lines are each equal to a number of basic colors assigned to the pixel circuits.

According to an eighth aspect of the present invention, in the first aspect of the present invention, the first signal line intersects with one side extending in the second direction of the circuit region, and the second signal line intersects with another side extending in the second direction of the circuit region.

According to a ninth aspect of the present invention, in the first aspect of the present invention, the switching elements are formed at positions overlapping the control line.

According to a tenth aspect of the present invention, in the ninth aspect of the present invention, the control line has a linear shape corresponding to a region including the switching elements and gaps between the switching elements inside the circuit region.

According to an eleventh aspect of the present invention, in the ninth aspect of the present invention, the control line has a linear shape with cutouts, the shape corresponding to a region that includes the switching elements and that does not include gaps between the switching elements inside the circuit region.

According to a twelfth aspect of the present invention, in the ninth aspect of the present invention, the switching elements are classified into a plurality of groups, and are arranged side by side in the first direction on a group basis, and the control line includes a plurality of partial wirings each having a linear shape corresponding to each of the groups of the switching elements inside the circuit region.

According to a thirteenth aspect of the present invention, in the first aspect of the present invention, the switching elements are alternately arranged on one side and on other side of the lead-out lines connected to the switching elements.

According to a fourteenth aspect of the present invention, in the first aspect of the present invention, the circuit region is set inside a counter region.

According to a fifteenth aspect of the present invention, in the first aspect of the present invention, the circuit region is set outside a counter region, and the active matrix substrate further includes a light shielding member that light-shields the circuit region.

According to a sixteenth aspect of the present invention, there is provided a display device including: the active matrix substrate according to any one of the first to fifteenth aspects; and a counter substrate opposed to the active matrix substrate.

Effects of the Invention

According to the first aspect of the present invention, the plurality of signal lines are divided and arranged on the one side and the other side of the control line inside the circuit region, and the two adjacent lead-out lines are connected to the two signal lines arranged respectively on the different sides of the control line via the switching elements. Accordingly, the wirings can be laid out within a predetermined range without making the width of wirings thin or the pitch narrow inside the circuit region, and occurrence of a disconnection or a leakage current inside the circuit region can be suppressed. Moreover, since a difference in the number of intersections with the other wirings becomes small between the closest signal line to the control line and the farthest signal line from the control line, and a difference in a blunting degree of the signals on the signal lines becomes small, occurrence of a luminance unevenness in a screen for inspection when the inspection is conducted by using the control line and the signal lines can be suppressed.

According to the second aspect of the present invention, the active matrix substrate in which the portions of the lead-out lines are alternately formed in the two wiring layers can exert the effects in the first aspect.

According to the third aspect of the present invention, the active matrix substrate in which the fan-out region is provided on the opposite side of the display region with the circuit region interposed and the lead-out lines are alternately formed in the two wiring layers inside the fan-out region can exert the effects in the first aspect.

According to the fourth aspect of the present invention, the active matrix substrate in which the fan-out region is provided between the display region and the circuit region and the lead-out lines are alternately formed in the two wiring layers inside the fan-out region can exert the effects in the first aspect. Moreover, since a disconnection or a short circuit of the lead-out lines inside the fan-out region can be detected, an inspection accuracy of the active matrix substrate can be enhanced.

According to the fifth aspect of the present invention, the active matrix substrate in which the lead-out lines are formed in the same wiring layer as the data lines can exert the effects in the first aspect.

According to the sixth aspect of the present invention, the active matrix substrate having the fan-out region between the display region and the circuit region can exert the effects in the first aspect. Moreover, since a disconnection or a short circuit of the lead-out lines inside the fan-out region can be detected, an inspection accuracy of the active matrix substrate can be enhanced.

According to the seventh aspect of the present invention, the active matrix substrate having the signal lines the number of which is twice the number of the basic colors assigned to the pixel circuits can exert the effects in the first aspect.

According to the eighth aspect of the present invention, the signal lines are divided and led out from the two sides extending in the second direction of the circuit region, and thus the arrangement positions of the terminals can be determined at a high degree of freedom, such as arranging a terminal connected to the first signal line and a terminal connected to the second signal line at distant positions.

According to the ninth or tenth aspects of the present invention, the switching elements are light-shielded by using the signal lines, and malfunction of the switching elements can be prevented.

According to the eleventh or twelfth aspect of the present invention, the area of an intersection portion between the control line and each of the lead-out lines is made small, and blunting of the signals on the control line and the data lines can be suppressed.

According to the thirteenth aspect of the present invention, a favorable layout inside the circuit region decreases the number of times of bending of the lead-out lines inside the circuit region, and can suppress a disconnection of the lead-out lines and a leakage current.

According to the fourteenth aspect of the present invention, in the case where the circuit region is set inside the counter region and outside the display region, the switching elements are light-shielded by using a black mask formed in the counter substrate, and malfunction of the switching elements can be prevented.

According to the fifteenth aspect of the present invention, in the case where the circuit region is set outside the counter region, the switching elements are light-shielded by using the light shielding member, and malfunction of the switching elements can be prevented.

According to the sixteenth aspect of the present invention, the display device with high reliability can be provided by using the active matrix substrate in which a disconnection, a leakage current, and a luminance unevenness of the screen for inspection are suppressed.

MODES FOR CARRYING OUT THE INVENTION (First Embodiment)

Figure 1:
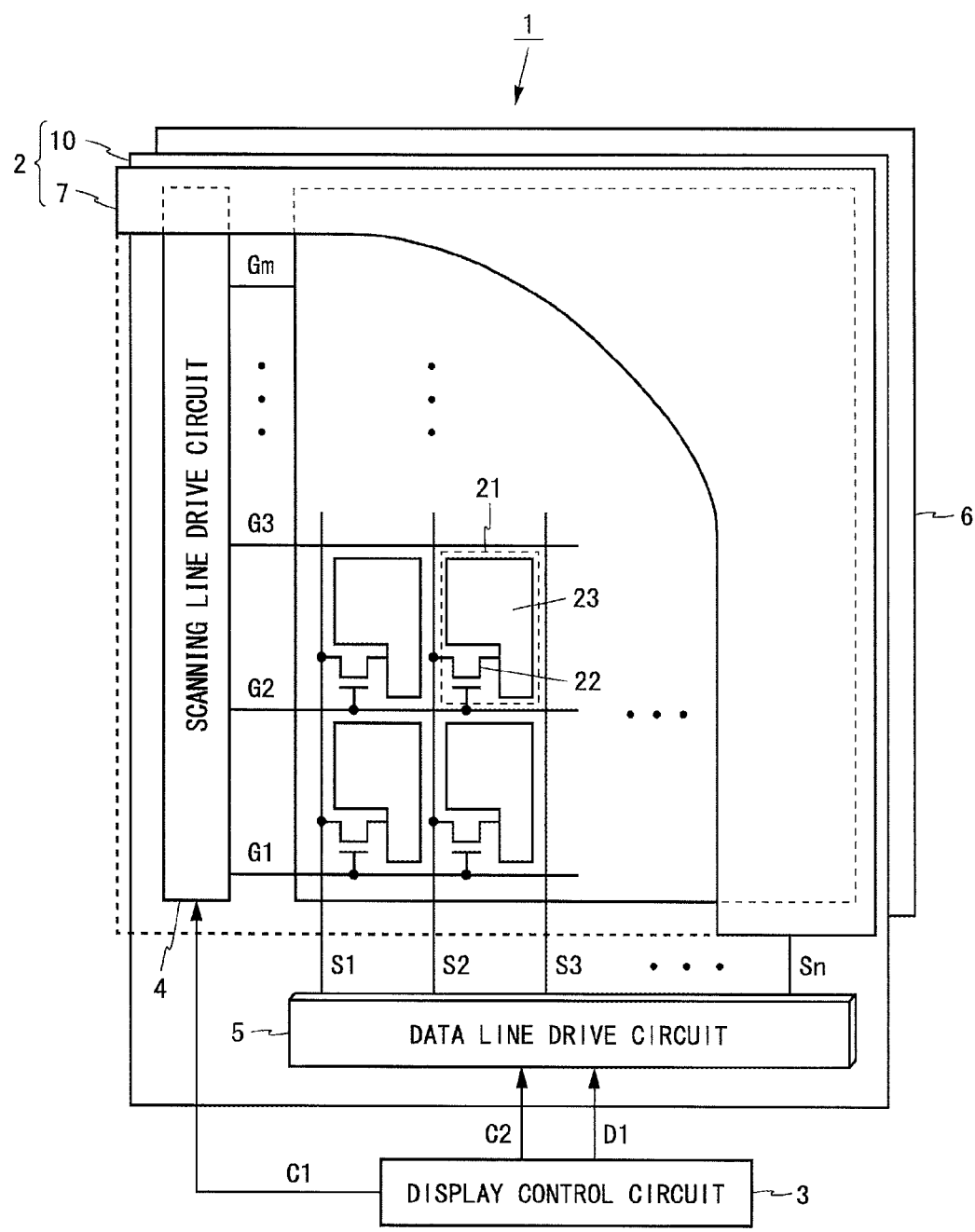
FIG. 1 is a block diagram showing a configuration of a liquid crystal display device including an active matrix substrate according to a first embodiment of the present invention.

FIG. 1 is a block diagram showing a configuration of a liquid crystal display device including an active matrix substrate according to a first embodiment of the present invention. A liquid crystal display device 1 shown in FIG. 1 includes a liquid crystal panel 2, a display control circuit 3, a scanning line drive circuit 4, a data line drive circuit 5, and a backlight 6. Hereinafter, m and n are integers of 2 or more, i is an integer of 1 or more and m or less, and j is an integer of 1 or more and n or less.

The liquid crystal panel 2 has a structure in which an active matrix substrate 10 and a counter substrate 7 are stuck together and a liquid crystal (not shown) is sandwiched between the two substrates. On the active matrix substrate 10, m scanning lines G1 to Gm, n data lines S1 to Sn, and (m×n) pixel circuits 21 are formed. On the active matrix substrate 10, the scanning line drive circuit 4 is formed integrally with the pixel circuits 21 and the like, and a semiconductor chip functioning as the data line drive circuit 5 is mounted.

Hereinafter, a direction in which the scanning lines extend (a horizontal direction in the drawing) is referred to as a row direction, and a direction perpendicular to the row direction is referred to as a column direction. The scanning lines G1 to Gm extend in the row direction, and are arranged parallel to one another. The data lines S1 to Sn extend in the column direction, and are arranged parallel to one another. The scanning lines G1 to Gm and the data lines S1 to Sn intersect at (m×n) points. The (m×n) pixel circuits 21 are arranged two-dimensionally, corresponding to the intersections between the scanning lines G1 to Gm and the data lines S1 to Sn.

The pixel circuits 21 each include an N channel type thin film transistor (hereinafter, referred to as a TFT) 22, and a pixel electrode 23. A gate terminal of the TFT 22 included in the pixel circuit 21 in an i-th row and a j-th column is connected to the scanning line Gi, one conduction terminal is connected to the data line Sj, and another conduction terminal is connected to the pixel electrode 23.

In the case where a counter electrode (not shown) is formed on the counter substrate 7, liquid crystal capacitance is formed by the pixel electrode 23 and the counter electrode. In the case where a common electrode (not shown) is formed on the active matrix substrate 10, the liquid crystal capacitance is formed by the pixel electrode 23 and the common electrode. The backlight 6 is disposed on a back surface side of the liquid crystal panel 2, and irradiates a back surface of the liquid crystal panel 2 with light.

The display control circuit 3 outputs a control signal C1 to the scanning line drive circuit 4, and outputs a control signal C2 and a data signal D1 to the data line drive circuit 5. The scanning line drive circuit 4 drives the scanning lines G1 to Gm, based on the control signal C1. The data line drive circuit 5 drives the data lines S1 to Sn, based on the control signal C2 and the data signal D1. More specifically, in each horizontal period, the scanning line drive circuit 4 selects one scanning line from the scanning lines G1 to Gm, and applies an ON voltage (a voltage that brings the TFTs 22 into an ON state) to the selected scanning line. The data line drive circuit 5 applies n data voltages in accordance with the data signal D1 to the data lines S1 to Sn in each horizontal period. Thus, n pixel circuits 21 are selected in one horizontal period, and the n data voltages are written to the n selected pixel circuits 21.

One of three basic colors of red, green, and blue is assigned to the pixel circuits 21. The (m×n) pixel circuits 21 are classified into red pixel circuits corresponding to red, green pixel circuits corresponding to green, and blue pixel circuits corresponding to blue on a column basis. Correspondingly, the data lines S1 to Sn are classified into red data lines connected to the red pixel circuits, green data lines connected to the green pixel circuits, and blue data lines connected to the blue pixel circuits in arrangement order. For example, the data lines S1, S4, . . . are classified as the red data lines, the data lines S2, S5, . . . are classified as the green data lines, and the data lines S3, S6, . . . are classified as the blue data lines.

Figure 2:
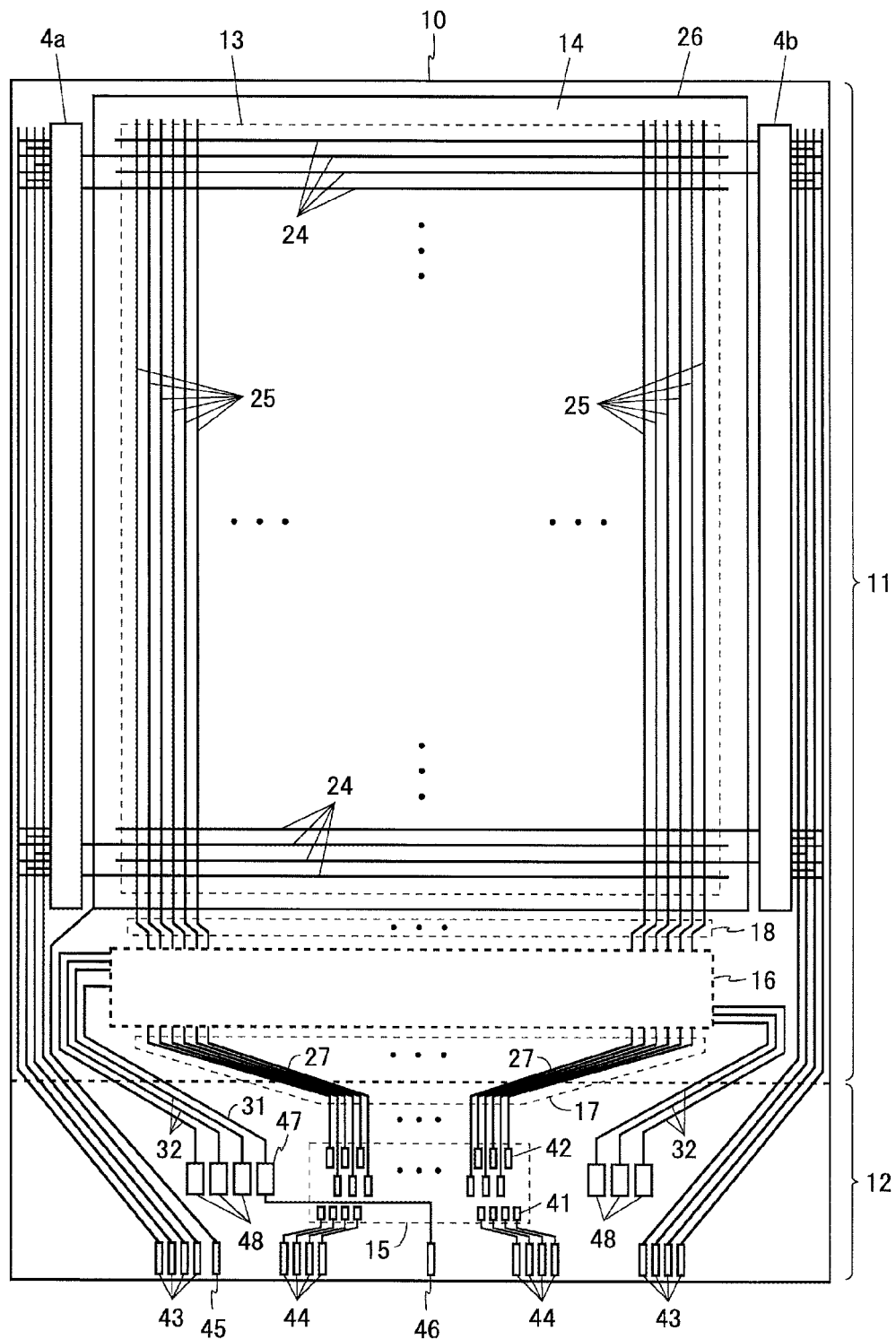
FIG. 2 is a plan view of the active matrix substrate according to the first embodiment of the present invention.

FIG. 2 is a plan view of the active matrix substrate 10. As shown in FIG. 2, the active matrix substrate 10 is divided into a counter region 11 opposed to the counter substrate 7, and a non-counter region 12 not opposed to the counter substrate 7. In the counter region 11, a display region 13 for arranging the pixel circuits is set. A portion excluding the display region 13 from the counter region 11 is referred to as a picture-frame region 14. Note that in FIG. 2, among elements formed on the active matrix substrate 10, elements unnecessary for understanding of the feature of the present embodiment are omitted appropriately.

In the display region 13, the (m×n) pixel circuits (not shown), m scanning lines 24, and n data lines 25 are formed. The (m×n) pixel circuits are arranged two-dimensionally inside the display region 13. The m scanning lines 24 extend in the row direction inside the display region 13. The n data lines 25 extend in the column direction inside the display region 13. The picture-frame region 14 is light-shielded by a black mask (not shown) formed on the counter substrate 7. In the picture-frame region 14, an annular wiring 26 surrounding the display region 13 is formed. The annular wiring 26 is connected to a counter electrode, a common electrode, or auxiliary capacitance wiring (not shown). The annular wiring 26 is provided in order to apply a predetermined voltage to the counter substrate, the counter electrode, or the auxiliary capacitance wiring.

The scanning line drive circuit 4 is formed by being divided into two portions in the picture-frame region 14. More specifically, a part of the scanning line drive circuit 4 (hereinafter, referred to as a first scanning line drive part 4*a*) is arranged along one side extending in the column direction (a left side in FIG. 2) of the display region 13, and a remaining part of the scanning line drive circuit 4 (hereinafter, referred to as a second scanning line drive part 4*b*) is arranged along another side extending in the column direction (a right side in FIG. 2) of the display region 13. One end (a left end in FIG. 2) of each of the odd-numbered scanning lines 24 is connected to the first scanning line drive part 4*a*, and one end (a right end in FIG. 2) of each of the even-numbered scanning lines 24 is connected to the second scanning line drive part 4*b*. Based on the control signal C1 output from the display control circuit 3, the first scanning line drive part 4*a* drives the odd-numbered scanning lines 24, and the second scanning line drive part 4*b* drives the even-numbered scanning lines 24.

In the non-counter region 12, a mounting region 15 for mounting the data line drive circuit 5 is set. In the mounting region 15, a plurality of connection terminals 41 connected to input terminals of the data line drive circuit 5, and n connection terminals 42 connected to output terminals of the data line drive circuit 5 are formed. In a portion other than the mounting region 15 of the non-counter region 12, a plurality of external terminals 43 to 46 for connecting external circuits (e.g., a flexible printed board), and a plurality of terminals for inspection 47, 48 are formed. The external terminals 43 to 46 are connected to the scanning line drive circuit 4, the connection terminals 41, the annular wiring 26, and the terminal for inspection 47, respectively. In use of the liquid crystal display device 1, a voltage that brings TFTs for inspection (described later) into an OFF state is applied to the external terminal 46.

In order to connect the n data lines 25 and the n connection terminals 42, n lead-out lines 27 are formed in the non-counter region 12 and the picture-frame region 14. A first end of each of the lead-out lines 27 (a lower end in FIG. 2) is connected to the corresponding connection terminal 42. A second end of each of the lead-out lines 27 is connected to the corresponding data line 25.

In a portion where the lead-out lines 27 are formed in the picture-frame region 14, a region for inspection 16 for forming a circuit that applies signals for inspection to the data lines 25 at the time of inspection of the liquid crystal panel 2 is set. The region for inspection 16 is set along one side extending in the row direction (a lower side in FIG. 2) of the display region 13 in the picture-frame region 14. Moreover, in the non-counter region 12 and the picture-frame region 14, a control line for inspection 31 and six signal lines for inspection 32 passing through the region for inspection 16 are formed.

Figure 3:
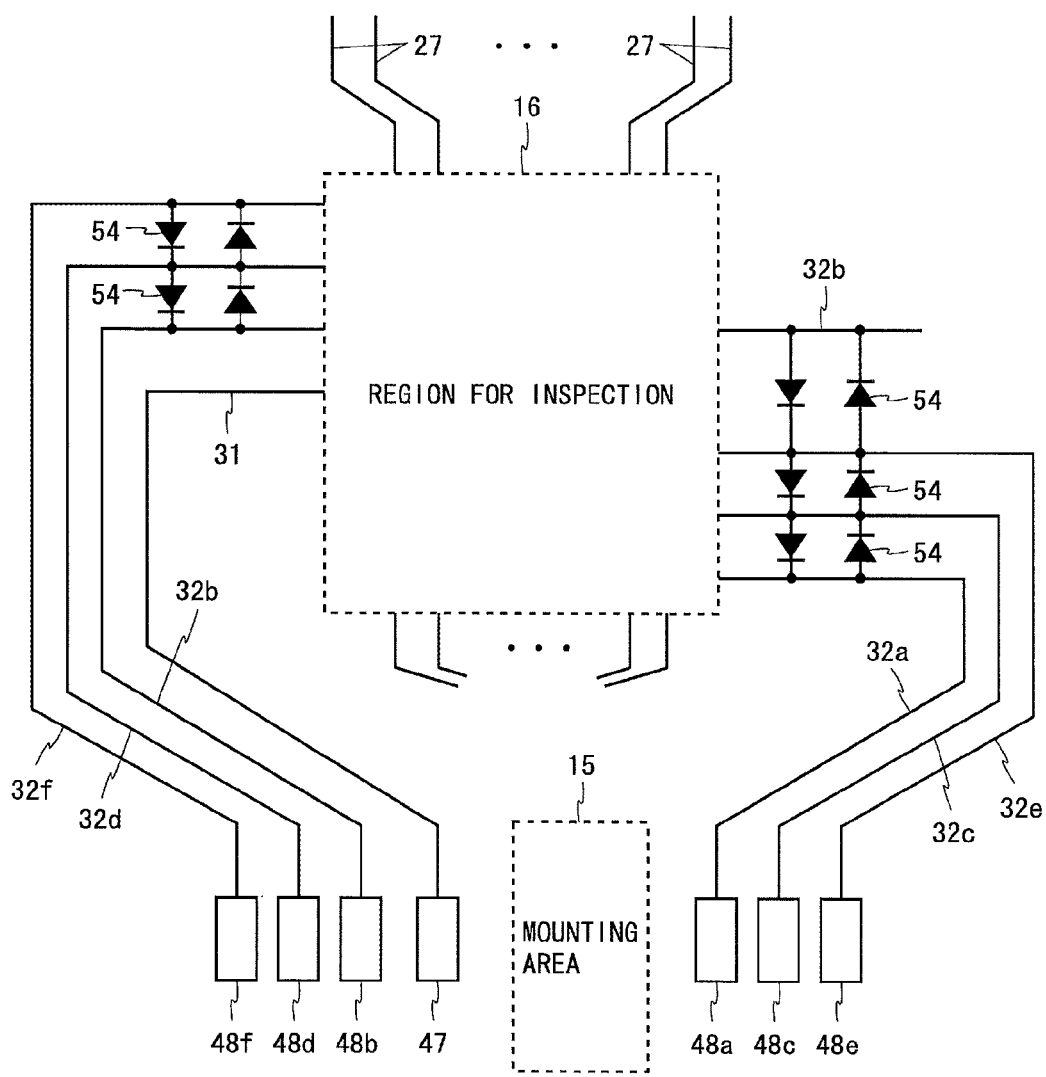
FIG. 3 is a view showing wirings passing through a region for inspection of the active matrix substrate shown in FIG. 2.

FIG. 3 is a view showing wirings passing through the region for inspection 16. As shown in FIG. 3, the terminal for inspection 47 is connected to the control line for inspection 31, and terminals for inspection 48*a* to 48*f* are connected to signal lines for inspection 32*a* to 32*f*, respectively. The n lead-out lines 27 pass in the column direction through an inside of the region for inspection 16. The control line for inspection 31 and the six signal lines for inspection 32*a* to 32*f* extend in the row direction inside the region for inspection 16, and pass in the row direction through the inside of the region for inspection 16. Note that "extend" means "extend in a straight line," and "extend linearly in a main direction while bending in a sub-direction."

Inside the region for inspection 16, the signal lines for inspection 32*a*, 32*c*, 32*e* are arranged on one side (a lower side in the drawing) of the control line for inspection 31, in an order of 32*a*, 32*c*, 32*e* starting from the farthest line from the control line for inspection 31. Inside the region for inspection 16, the signal lines for inspection 32*b*, 32*d*, 32*f* are arranged on the other side (an upper side in the drawing) of the control line for inspection 31, in an order of 32*b*, 32*d*, 32*f* starting from the closest line to the control line for inspection 31. The terminals for inspection 48*a*, 48*c*, 48*e* are arranged on one side in the row direction (a right side in FIG. 3) of the mounting region 15, in an order of 48*a*, 48*c*, 48*e* starting from the closest terminal to the mounting region 15. The terminals for inspection 47, 48*b*, 48*d*, 48*f* are arranged on the other side in the row direction (a left side in FIG. 3) of the mounting region 15, in an order of 47, 48*b*, 48*d*, 48*f* starting from the closest terminal to the mounting region 15.

The signal lines for inspection 32*a*, 32*c*, 32*e* intersect with one side extending in the column direction (a right side in the drawing) of the region for inspection 16. The signal lines for inspection 32*a*, 32*c*, 32*e* are led out from a right side of the region for inspection 16, and pass through a portion on the right side of the region for inspection 16 to be connected to the terminals for inspection 48*a*, 48*c*, 48*e* arranged on the right side of the mounting region 15, respectively. The control line for inspection 31, and the signal lines for inspection 32*b*, 32*d*, 32*f* intersect with another side extending in the column direction (a left side in the drawing) of the region for inspection 16. The control line for inspection 31 and the signal lines for inspection 32*b*, 32*d*, 32*f* are led out from the left side of the region for inspection 16, and pass through the left side of the region for inspection 16 to be connected to the terminals for inspection 47, 48*b*, 48*d*, 48*f* arranged on the left side of the mounting region 15, respectively.

For ESD (Electrostatic Discharge) countermeasures, the signal lines for inspection 32*a* to 32*f* are connected to one another by using diode rings. More specifically, two diodes 54 are provided in reverse directions between the signal lines for inspection 32*a*, 32*c*, between the signal lines for inspection 32*c*, 32*e*, between the signal lines for inspection 32*b*, 32*d*, and between the signal lines for inspection 32*d*, 32*f*, respectively. Moreover, the signal line for inspection 32*b* is extended to the right side of the region for inspection 16, and the two diodes 54 are provided in reverse directions between an extended portion of the signal line for inspection 32*b* and the signal line for inspection 32*e*. Note that any of the signal lines for inspection 32*d*, 32*f* may be extended, and the two diodes 54 may be provided in reverse directions between an extended portion thereof and the signal line for inspection 32*e*.

As shown in FIG. 2, a pitch (an arrangement interval) of the data lines 25 is wider than a pitch of the connection terminals 42. In order to make a pitch at the second ends of the lead-out lines 27 wider than a pitch at the first ends, two fan-out regions 17, 18 are set. The fan-out region 17 is set between the mounting region 15 and the region for inspection 16, and the fan-out region 18 is set between the region for inspection 16 and the display region 13. The lead-out lines 27 are laid out in a fan shape inside the fan-out regions 17, 18. More specifically, the lead-out lines 27 extend in the column direction or extend mainly in a diagonal direction inside the fan-out regions 17, 18. Typically, the lead-out lines 27 close to the center extend in directions close to the column direction (directions having small angles formed with the column direction), and the lead-out lines 27 apart from the center extend in directions apart from the column direction (directions having large angles formed with the column direction).

Note that the aspect of laying out in the fan shape includes an aspect in which when the lead-out lines 27 are divided into two groups in arrangement order, portions extending in the diagonal direction inside the fan-out regions of the lead-out lines in the first group (hereinafter, referred to as diagonal portions) are parallel to one another, and a direction in which bending points at one ends of the diagonal portions line up and a direction in which bending points at other ends of the diagonal portions line up are not parallel, and the same applies to the lead-out lines in the second group.

Wirings of the active matrix substrate 10 are formed in any of two wiring layers. Hereinafter, it is assumed that the scanning lines 24 are formed in a first wiring layer, and the data lines 25 are formed in a second wiring layer. The control line for inspection 31 and the signal lines for inspection 32 are formed in the first wiring layer as with the scanning lines 24. The lead-out lines 27 are classified into those formed in the second wiring layer as with the data lines 25, and those each having a portion formed in the first wiring layer and a portion formed in the second wiring layer.

Figure 4:
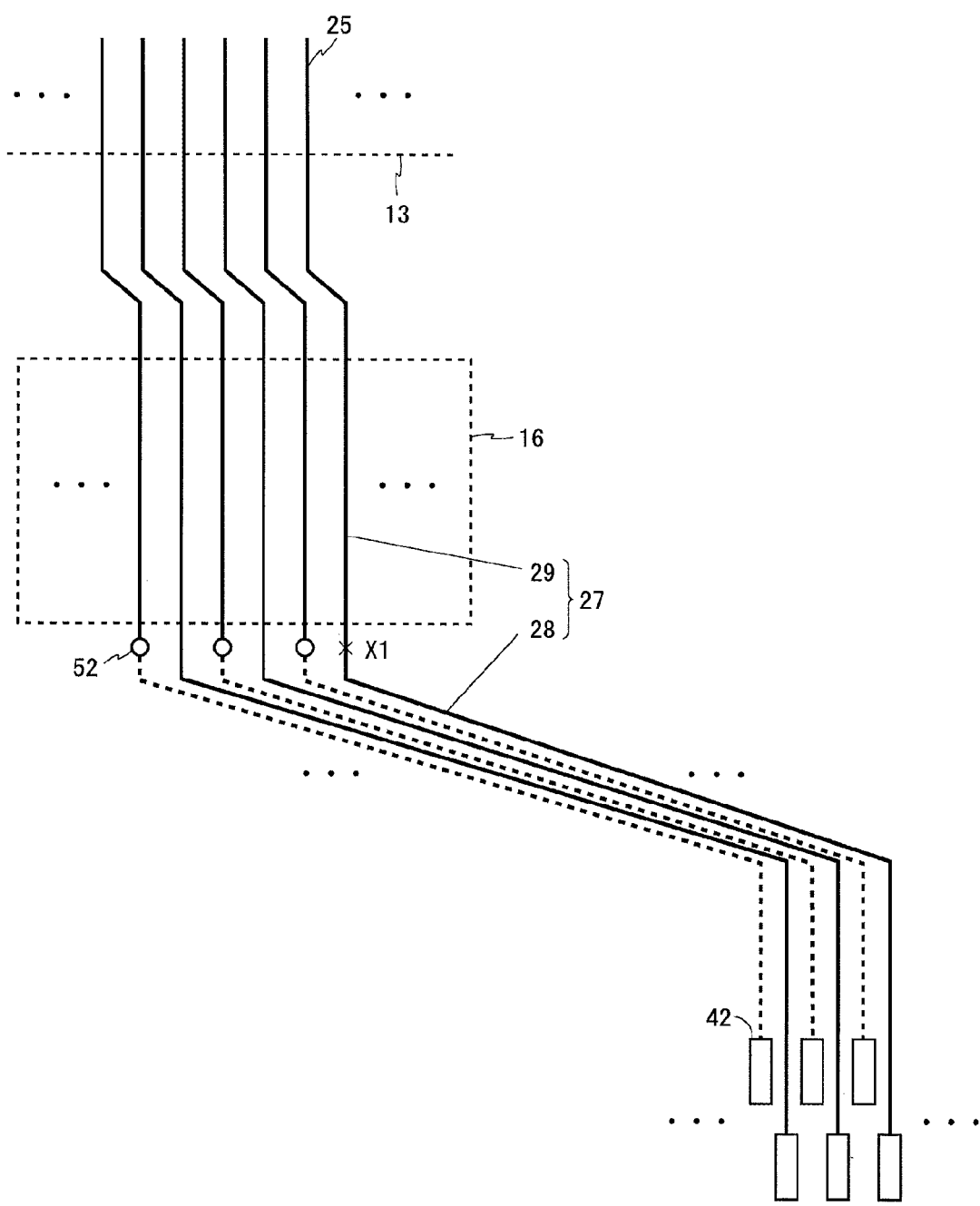
FIG. 4 is a view showing lead-out lines of the active matrix substrate shown in FIG. 2.

FIG. 4 is a view showing the lead-out lines 27. In FIG. 4, thick broken lines indicate wirings formed in the first wiring layer, and thick solid lines indicate wirings formed in the second wiring layer. When a point X1 is set between the region for inspection 16 and the second bending point starting from the first end side (the connection terminal 42 side) among the bending points of each of the lead-out lines 27, the lead-out line 27 is divided into a first portion 28 from the first end to the point X1, and a second portion 29 from the point X1 to the second end.

A pitch of the second portions 29 of the lead-out lines 27 is wide. Therefore, in order to connect to the data lines 25 easily, the second portions 29 of the lead-out lines 27 are formed in the second wiring layer as with the data lines 25. In contrast, a pitch of the first portions 28 of the lead-out lines 27 is narrow. When the adjacent wirings are formed at a narrow pitch in the same wiring layer, a short circuit of the wirings occurs easily. Therefore, the first portions 28 of the lead-out lines 27 are alternately formed in the first wiring layer and the second wiring layer in the arrangement order. For example, the first portions 28 of the odd-numbered lead-out lines 27 are formed in the first wiring layer, and the first portions 28 of the even-numbered lead-out lines 27 are formed in the second wiring layer. In the case where the first portions 28 of the lead-out lines 27 are formed in the first wiring layer, contacts 52 (each indicated by a white circle in the drawing) each connecting the first portion 28 and the second portion 29 are formed at the points X1 of the lead-out lines 27. The first portions 28 of the lead-out lines 27 are alternately formed in the two wiring layers, and thus the first portions 28 of the two adjacent lead-out lines 27 can be arranged close, or can be arranged such that portions thereof overlap each other.

The lead-out lines 27 are classified into two types, those having the first portions formed in the first wiring layer, and those having the first portions formed in the second wiring layer. The data lines 25 are classified into three types, red data lines, green data lines, and blue data lines. In combination of both, the lead-out lines 27 are classified into the following six types.

(1) The lead-out line having the first portion formed in the first wiring layer, and connected to the blue data line (2) The lead-out line having the first portion formed in the second wiring layer, and connected to the red data line (3) The lead-out line having the first portion formed in the first wiring layer, and connected to the green data line (4) The lead-out line having the first portion formed in the second wiring layer, and connected to the blue data line (5) The lead-out line having the first portion formed in the first wiring layer, and connected to the red data line (6) The lead-out line having the first portion formed in the second wiring layer, and connected to the green data line Hereinafter, these six types of lead-out lines 27 are referred to as first to sixth lead-out lines in the above-described order. The first to sixth lead-out lines correspond to the signal lines for inspection 32*a* to 32*f*, respectively.

Figure 5:
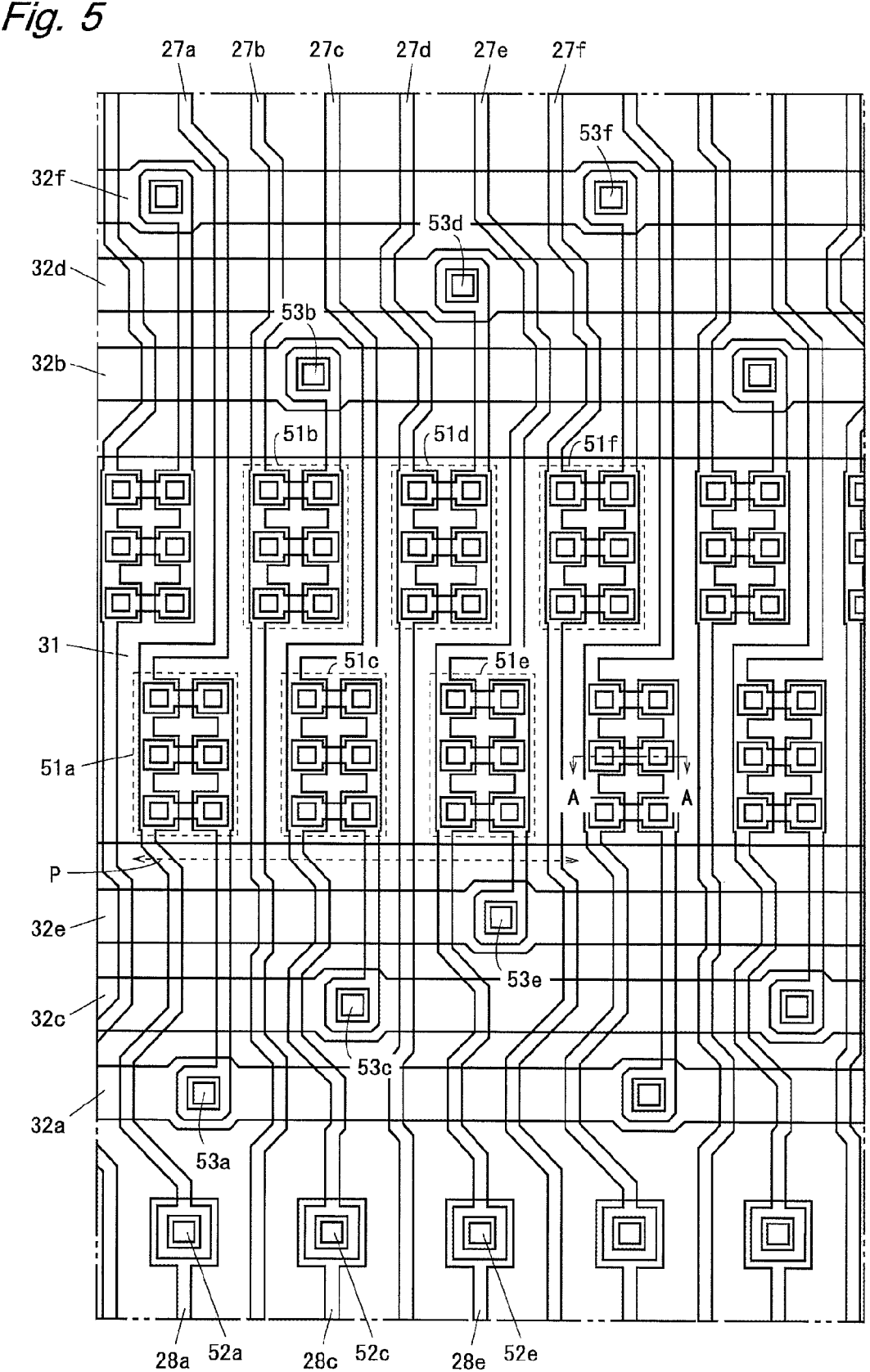
FIG. 5 is a layout view of the region for inspection and a vicinity of the region for inspection in the active matrix substrate shown in FIG. 2.
Figure 6:
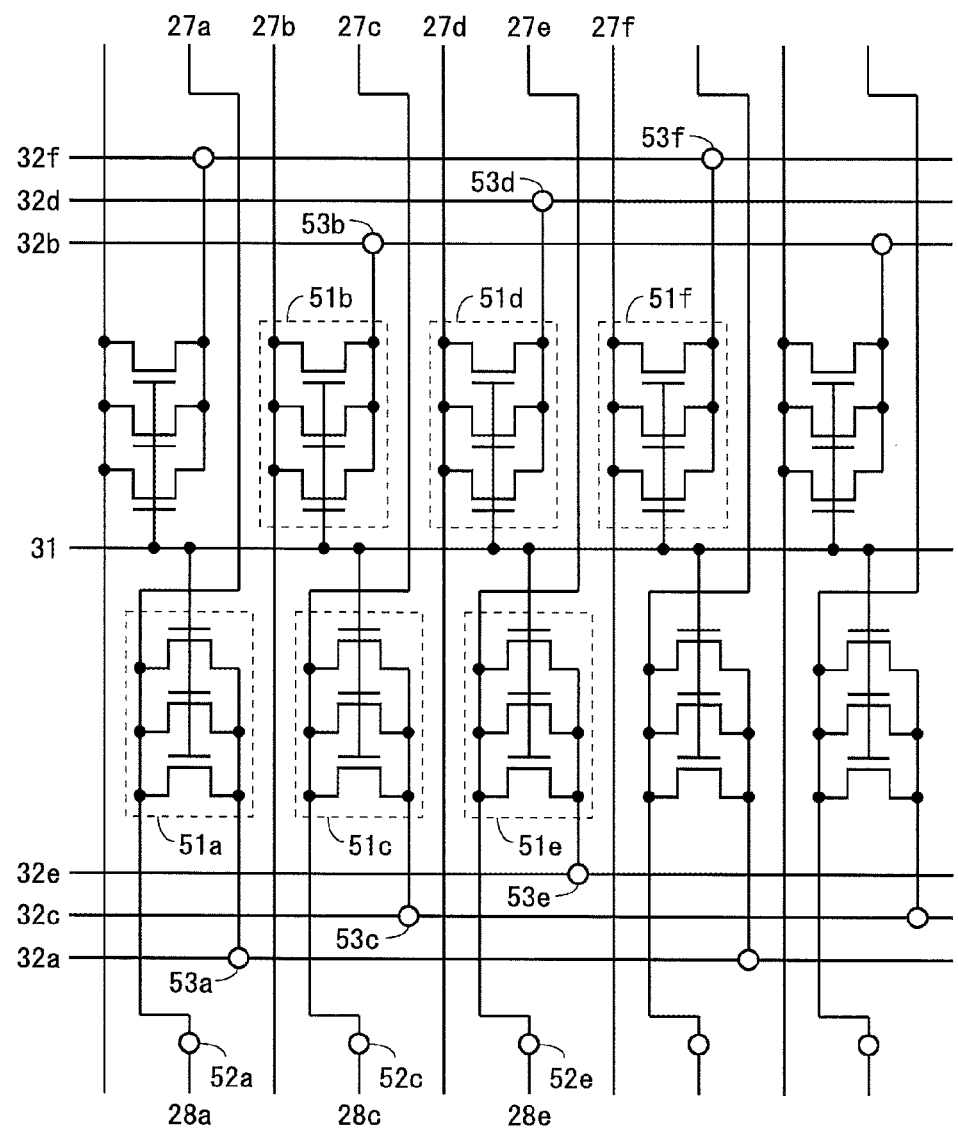
FIG. 6 is an equivalent circuit diagram of the portion shown in FIG. 5.

FIG. 5 is a layout view of the region for inspection 16 and a vicinity of the region for inspection 16. In FIG. 5, lead-out lines 27*a* to 27*f*, the control line for inspection 31, the signal lines for inspection 32*a* to 32*f*, TFTs for inspection 51*a* to 51*f*, and contacts 52*a*, 52*c*, 52*e*, 53*a* to 53*f* are shown. The lead-out lines 27*a* to 27*f* are the above-described first to sixth lead-out lines, respectively. The first portions of the lead-out lines 27*a*, 27*c*, 27*e* are given reference numerals 28*a*, 28*c*, 28*e*, respectively. FIG. 6 is an equivalent circuit diagram of a portion shown in FIG. 5.

The lead-out lines 27*a* to 27*f* are formed in the second wiring layer inside the region for inspection 16, and pass in the column direction through the inside of the region for inspection 16 while bending. The control line for inspection 31 and the signal lines for inspection 32*a* to 32*f* are formed in the first wiring layer, and extend in the row direction inside the region for inspection 16. The signal lines for inspection 32*a*, 32*c*, 32*e* are arranged on the one side (the lower side in the drawing) of the control line for inspection 31 inside the region for inspection 16. The signal lines for inspection 32b, 32d, 32f are arranged on the other side (the upper side in the drawing) of the control line for inspection 31 inside the region for inspection 16.

In the vicinity of intersections between the lead-out lines 27a to 27f and the control line for inspection 31, the TFTs for inspection 51a to 51f are formed, respectively. The TFT for inspection 51 has three gate terminals, three first conduction terminals (terminals on the left side in FIG. 5), and three second conduction terminals. The first conduction terminal and the second conduction terminal paired with the first conduction terminal are arranged side by side in the row direction.

The gate terminals of the TFTs for inspection 51a to 51f are connected to the control line for inspection 31. The first conduction terminals of the TFTs for inspection 51a to 51f are connected to the lead-out lines 27a to 27f, respectively. The second conduction terminals of the TFTs for inspection 51a to 51f are connected to the signal lines for inspection 32a to 32f via connection wirings extending in the column direction and the contacts 53a to 53f. The contacts 53a, 53c, 53e are provided on the one side of the control line for inspection 31 together with the signal lines for inspection 32a, 32c, 32e. The contacts 53b, 53d, 53f are provided on the other side of the control line for inspection 31 together with the signal lines for inspection 32b, 32d, 32f. The TFTs for inspection 51a to 51f are arranged inside the region for inspection 16, and function as switching elements that control a conduction state between the lead-out lines 27a to 27f and the signal lines for inspection 32a to 32f corresponding to the lead-out lines 27a to 27f, in accordance with a signal on the control line for inspection 31.

The signal lines for inspection 32a, 32c, 32e arranged on the one side of the control line for inspection 31 inside the region for inspection 16 are referred to as first signal lines for inspection, and the signal lines for inspection 32b, 32d, 32f arranged on the other side of the control line for inspection 31 inside the region for inspection 16 are referred to as second signal lines for inspection. In the active matrix substrate 10, one of the two adjacent lead-out lines 27 is connected to the first signal line for inspection via the TFT for inspection 51, and the other is connected to the second signal line for inspection via the TFT for inspection 51.

As shown in FIG. 5, the control line for inspection 31 is formed at a position where the control line for inspection 31 overlaps the TFTs for inspection 51. The control line for inspection 31 has a linear shape corresponding to a region including the TFTs for inspection 51 and gaps between the TFTs for inspection 51 inside the region for inspection 16. The TFTs for inspection 51a to 51f are respectively arranged on the same side (a right side in FIG. 5) of the lead-out lines 27a to 27f connected to the TFTs for inspection 51a to 51f. One TFT for inspection 51 is arranged between the two adjacent lead-out lines 27.

Figure 7:
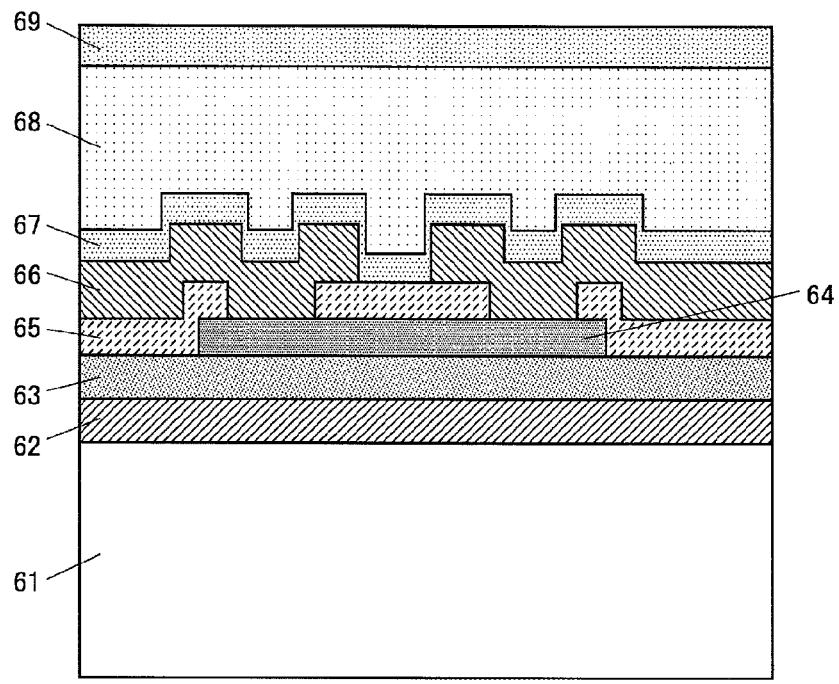
FIG. 7 is a cross-sectional view along A-A' in FIG. 5.

FIG. 7 is a cross-sectional view along A-A' in FIG. 5. As shown in FIG. 7, a control line for inspection 62, a gate insulating film 63, a semiconductor layer 64, a channel protection film 65, a conductive electrode 66, and first to third protection films 67 to 69 are sequentially formed on a glass substrate 61. The control line for inspection 62 is formed in the first wiring layer by using a metal material. For the gate insulating film 63, for example, silicon nitride (SiNx), silicon oxide (SiO$_2$), or a laminated film of these is used. The semiconductor layer 64 is formed, for example, by using an oxide semiconductor such as IGZO that is Indium-Gallium-Zinc Oxide, or amorphous silicon. The channel protection film 65 is formed, for example, by using silicon nitride or silicon oxide. The conductive electrode 66 is formed in the second wiring layer by using a metal material. The first protection film 67 is formed, for example, by using silicon nitride or silicon oxide. The second protection film 68 is an organic film formed by using an organic polymer compound. The third protection film 69 is formed, for example, by using silicon nitride. Note that the channel protection film 65 is not necessarily required to be provided.

Figure 8:
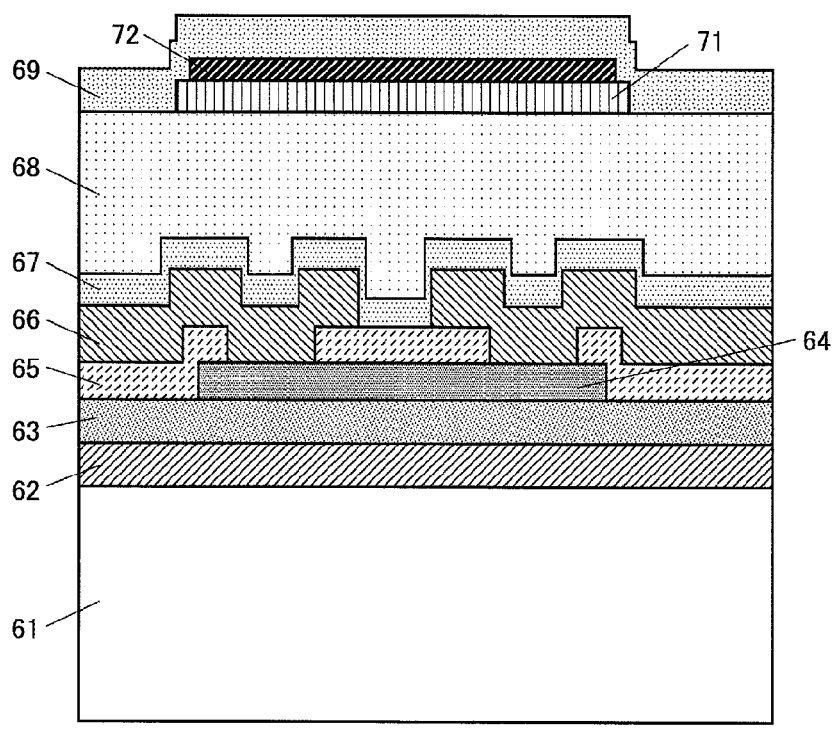
FIG. 8 is another example of the cross-sectional view along A-A' in FIG. 5.

Moreover, as shown in FIG. 8, a transparent electrode 71 and a light shielding film 72 may be provided between the second protection film 68 and the third protection film 69. The transparent electrode 71 is formed, for example, by using indium tin oxide (ITO) or indium zinc oxide (IZO). The light shielding film 72 is formed by using copper, molybdenum, aluminum, alloy of these, or a laminated film of these. Note that while in FIG. 8, the light shielding film 72 is provided on the transparent electrode 71, the transparent electrode 71 may be provided on the light shielding film 72. Moreover, the transparent electrode 71 is not necessarily required to be provided.

At the time of inspection of the liquid crystal panel 2 including the active matrix substrate 10, the control signal C1 is supplied to the scanning line drive circuit 4 via the external terminals 43, and thus the ON voltage is applied to all the scanning lines 24, and all the pixel circuits inside the display region 13 are selected. In addition, an ON voltage (a voltage that brings the TFTs for inspection 51 into an ON state) is applied to the terminal for inspection 47 connected to the control line for inspection 31, and the signals for inspection in accordance with colors of a screen for inspection are applied to the terminals for inspection 48a to 48f connected to the signal lines for inspection 32a to 32f. Moreover, a predetermined signal is also input to the counter electrode, the common electrode, or the auxiliary capacitance wiring via the external terminal 45. Thus, the signals for inspection are written to all the pixel circuits inside the display region 13, and the screen for inspection is displayed in the liquid crystal panel 2. The liquid crystal panel 2 can be inspected by checking the screen for inspection visually or with an inspection machine.

Moreover, the control signal C1 is supplied to the scanning line drive circuit 4 via the external terminals 43, and thus the ON voltage can be applied sequentially to the scanning lines 24 one by one. Moreover, since the active matrix substrate 10 has the six signal lines for inspection 32a to 32f, the signals for inspection different from one another can be applied to the adjacent six data lines 25. For this reason, the signals for inspection corresponding to the basic colors can be applied to the data lines 25, and the signals for inspection different from one another can be applied to the adjacent data lines 25. Accordingly, the signals for inspection are input, corresponding to the driving in which data voltages having different polarities are applied to the adjacent data lines, as in dot-reversal driving or column-reversal driving, and the inspection can be conducted in a state closer to display of a final product.

Hereinafter, effects of the active matrix substrate 10 according to the present embodiment will be described, as compared with an active matrix substrate in which the six signal lines for inspection are arranged on the same side of the control line for inspection inside the region for inspection (hereinafter, the active matrix substrate will be referred to as an active matrix substrate according to an comparative example). Hereinafter, a portion corresponding to the six lead-out lines is referred to as a repeat unit.

Figure 9:
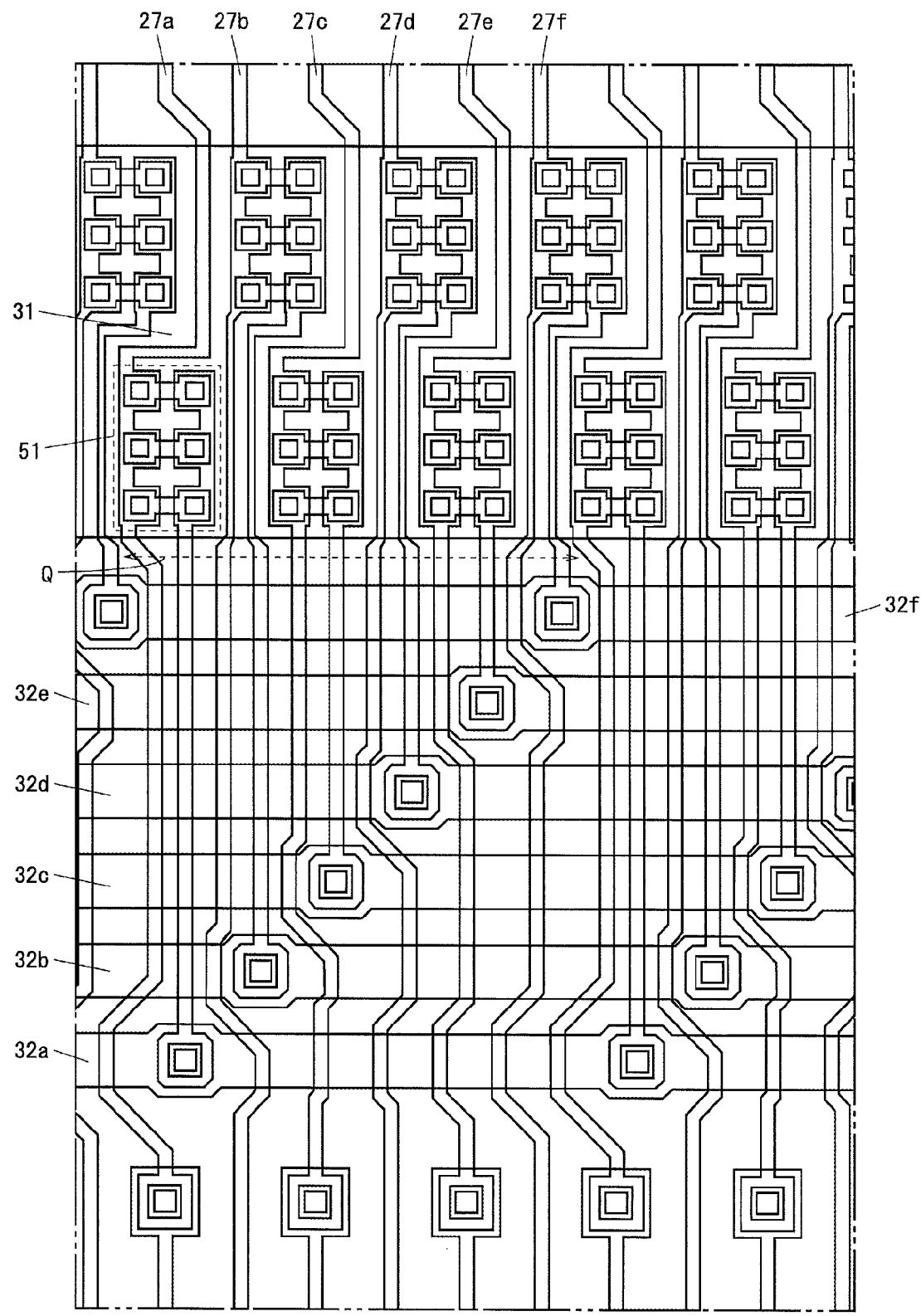
FIG. 9 is a layout view of a region for inspection and a vicinity of the region for inspection in an active matrix substrate according to a comparative example.

FIG. 9 is a layout view of a region for inspection and a vicinity of the region for inspection in the active matrix substrate according to the comparative example. As shown in FIG. 9, in the active matrix substrate according to the comparative example, since all the signal lines for inspection 32a to 32f are arranged on the same side of the control line for inspection 31, all connection wirings connected to the second terminals of the TFTs for inspection 51 need to be extended on the same side (the lower side in FIG. 9) of the control line for inspection 31. For this reason, the six lead-out lines and the six connection wirings need to be arranged side by side in the row direction for each repeat unit between the control line for inspection 31 and the signal line for inspection 32f (Q portion shown in FIG. 9). In order to lay out these wirings within a limited range, a width of the wirings needs to be made thin, and a pitch thereof needs to be made narrow. However, when the width of the wirings is made thin, a disconnection occurs easily, and when the pitch is made narrow, a leakage current occurs easily.

Moreover, in the active matrix substrate according to the comparative example, the signal line for inspection 32a which is the farthest from the control line for inspection 31 intersects with the other wirings at five points for each repeat unit, while the signal line for inspection 32f which is the closest to the control line for inspection 31 intersects with the other wirings at ten points for each repeat unit. Since a difference in the number of intersections with the other wirings is large between the signal lines for inspection 32a, 32f, a difference in capacitance formed at intersection portions with the other wirings is large, and a difference in a blunting degree of the signals for inspection is also large. When the difference in the blunting degree of the signals for inspection is large, a luminance unevenness occurs in the screen for inspection, and an inspection accuracy of the liquid crystal panel 2 decreases. In this manner, the active matrix substrate according to the comparative example has a problems that a disconnection or a leakage current occurs easily and the luminance unevenness occur in the screen for inspection.

In contrast, in the active matrix substrate 10 according to the present embodiment, since the six signal lines for inspection 32a to 32f are arranged by being divided into the one side and the other side of the control line for inspection 31, the connection wirings connected to the second terminals of the TFTs for inspection 51 only need to be extended by being divided into the one side and the other side (the upper side and the lower side in FIG. 5) of the control line for inspection 31. For this reason, the six lead-out lines and the three connection wirings only need to be arranged side by side in the row direction for each repeat unit between the control line for inspection 31 and the signal line for inspection 32e (P portion shown in FIG. 5). Moreover, in order to connect one of the two adjacent lead-out lines 27 to one of the signal lines for inspection 32a, 32c, 32e via the TFT for inspection 51, and in order to connect the other to one of the signal lines for inspection 32b, 32d, 32f via the TFT for inspection 51, the connection wirings connected to the second terminals of the TFTs for inspection 51 only need to be extended alternately on the one side and on the other side of the control line for inspection 31. Therefore, according to the active matrix substrate 10 according to the present embodiment, the wirings are laid out within a predetermined range without making the width of wirings thin or the pitch narrow inside the region for inspection 16, and occurrence of the disconnection or the leakage current inside the region for inspection 16 can be suppressed.

Moreover, in the active matrix substrate 10 according to the present embodiment, the signal line for inspection 32a which is the farthest from the control line for inspection 31 intersects with the other wirings at five points for each repeat unit, and the signal line for inspection 32e which is the closest to the control line for inspection 31 intersects with the other wirings at seven points for each repeat unit. Since the difference in the number of intersections with the other wirings is small between the signal lines for inspection 32a, 32e, the difference in capacitance formed at intersection portions with the other wirings is small, and the difference in the blunting degree of the signals for inspection is also small. Therefore, according to the active matrix substrate 10 according to the present embodiment, occurrence of the luminance unevenness in the screen for inspection is suppressed, and the inspection accuracy of the liquid crystal panel 2 can be enhanced.

As described above, the active matrix substrate 10 according to the present embodiment includes the plurality of pixel circuits 21 arranged two-dimensionally inside the display region 13, the plurality of scanning lines 24 extending in a first direction (the row direction) inside the display region 13, the plurality of data lines 25 extending in a second direction (the column direction) inside the display region 13, the plurality of lead-out lines 27 that is connected to the data line 25 and that passes in the second direction through the inside of the circuit region (the region for inspection 16) set outside the display region 13, the control line (the control line for inspection 31) extending in the first direction inside the circuit region, the plurality of signal lines (the six signal lines for inspection 32) extending in the first direction inside the circuit region, and the plurality of switching elements (the TFTs for inspection 51) that is arranged inside the circuit region and that controls the conduction state between the lead-out line 27 and the signal line corresponding to the lead-out line 27 in accordance with the signal on the control line. The signal lines include the first signal lines (the signal lines for inspection 32a, 32c, 32e) arranged on the one side of the control line inside the circuit region, and the second signal lines (the signal lines for inspection 32b, 32d, 32f) arranged on the other side of the control line inside the circuit region. One of the two adjacent lead-out lines 27 is connected to the first signal line (one of the signal lines for inspection 32a, 32c, 32e) via the switching element, and the other is connected to the second signal line (one of the signal lines for inspection 32b, 32d, 32f) via the switching element.

In this manner, in the active matrix substrate 10 according to the present embodiment, the plurality of signal lines is arranged by being divided into the one side and the other side of the control line inside the circuit region, and the two adjacent lead-out lines 27 are connected via the switching elements to the two signal lines arranged on the different sides of the control line, respectively. Accordingly, the wirings are laid out within the predetermined range without making the width of the wirings thin and making the pitch narrow inside the circuit region, and occurrence of the disconnection or the leakage current inside the circuit region can be suppressed. Moreover, since the difference in the number of intersections with the other wirings becomes small between the signal line which is the closest to the control line (the signal line for inspection 32e) and the signal line which is the farthest from the control line (the signal line for inspection 32a), and the difference in the blunting degree of the signals on the signal lines becomes small, occurrence of the luminance unevenness in the screen for inspection when the inspection is conducted by using the control line and the signal lines can be suppressed.

Moreover, in the active matrix substrate 10, the control line and the signal lines are formed in the same wiring layer as the scanning lines 24, and the lead-out lines 27 connected to the second signal lines via the switching elements are formed in the same wiring layer as the data lines 25. The lead-out lines 27 connected to the first signal lines via the switching elements each have the first portion 28 formed in the same wiring layer as the scanning lines 24, and the second portion 29 formed in the same wiring layer as the data lines 25, and are formed in the same wiring layer as the data lines 25 inside the circuit region. Accordingly, the active matrix substrate in which the portions of the lead-out lines are alternately formed in the two wiring layers can exert the above-described effects.

Moreover, the lead-out lines 27 are arranged in a fan shape in the fan-out region 17 set on the opposite side of the display region 13 with the circuit region interposed. The lead-out lines 27a, 27c, 27e connected to the first signal lines via the switching elements are formed in the same wiring layer as the scanning lines 24 inside the fan-out region 17. Accordingly, the active matrix substrate in which the fan-out region is provided on the opposite side of the display region with the circuit region interposed, and in which the lead-out lines are alternately formed in the two wiring layers inside the fan-out region can exert the above-described effects. Moreover, the number of the first signal lines and the number of the second signal lines are each equal to the number of the basic colors assigned to the pixel circuits 21 (here, three). Accordingly, the active matrix substrate having the number of the signal lines twice the number of the basic colors assigned to the pixel circuits can exert the above-described effects.

Moreover, the first signal lines intersect with the one side extending in the second direction (the right side extending in the column direction) of the circuit region, and the second signal lines intersect with another side extending in the second direction (the left side extending in the column direction) of the circuit region. In this manner, the signal lines are divided and led out from the two sides extending in the second direction of the circuit region, and thus the arrangement positions of the terminals (terminals for inspection 48) can be determined at a high degree of freedom, such as arranging the terminals connected to the first signal lines (the terminals for inspection 48a, 48c, 48e) and the terminals connected to the second signal lines (the terminals for inspection 48b, 48d, 48f) at distant positions.

Moreover, the switching elements are formed at positions overlapping the control line. The control line has a linear shape corresponding to the region including the switching elements and the gaps between switching elements inside the circuit region. Accordingly, the switching elements are light-shielded by using the control line, and malfunction of the switching elements can be prevented. Moreover, the circuit region is set outside the display region 13 and inside the counter region 11. Accordingly, the switching elements are light-shielded by using a black mask formed in the counter substrate 7, and malfunction of the switching elements can be prevented.

Moreover, according to the liquid crystal display device 1 including the active matrix substrate 10 according to the present embodiment and the counter substrate 7, reliability of the liquid crystal display device can be enhanced by using the active matrix substrate in which the disconnection, the leakage current, and the luminance unevenness of the screen for inspection are suppressed.

Figure 10:
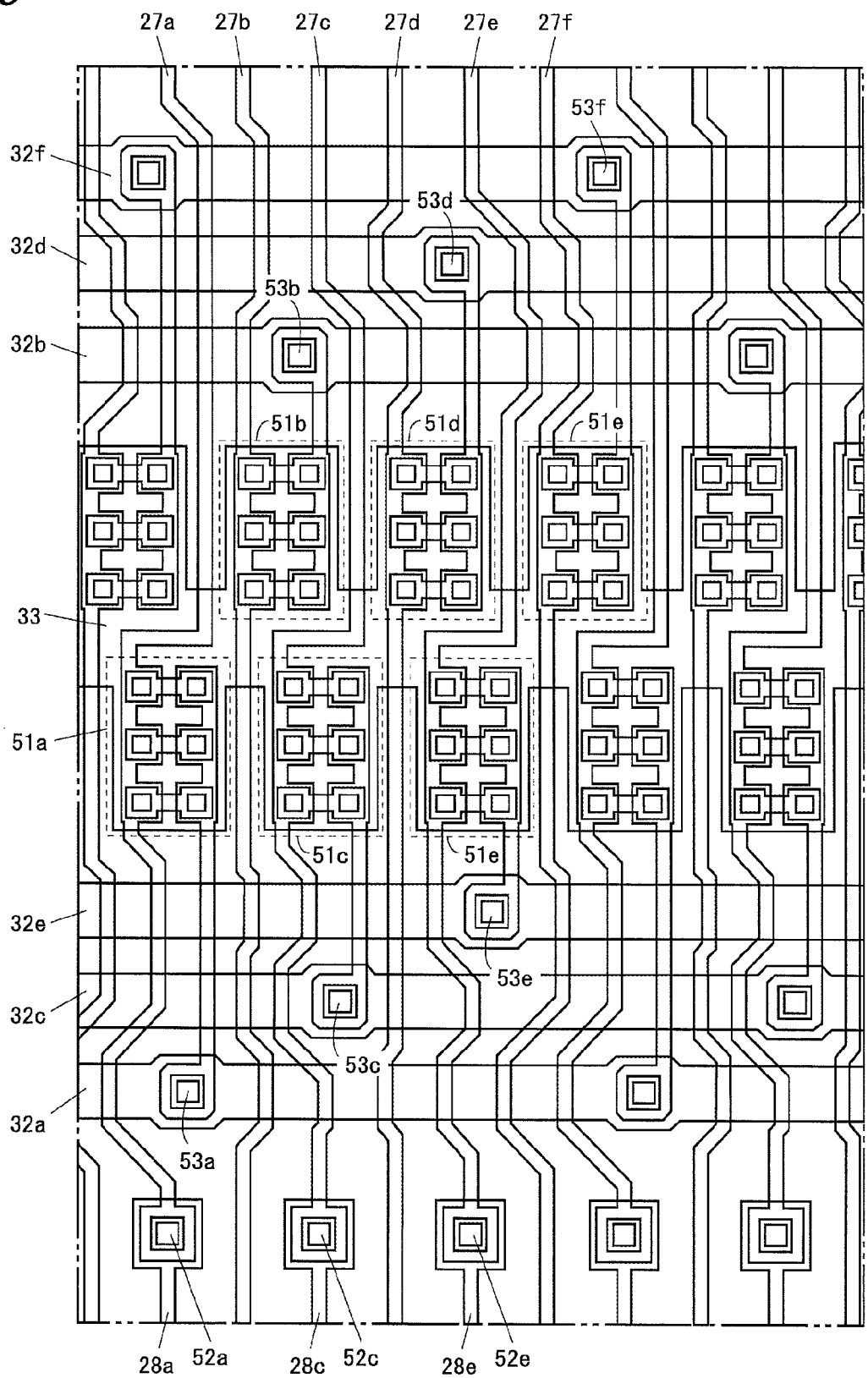
FIG. 10 is a layout view of a region for inspection and a vicinity of the region for inspection in an active matrix substrate according to a first modification of the first embodiment.
Figure 11:
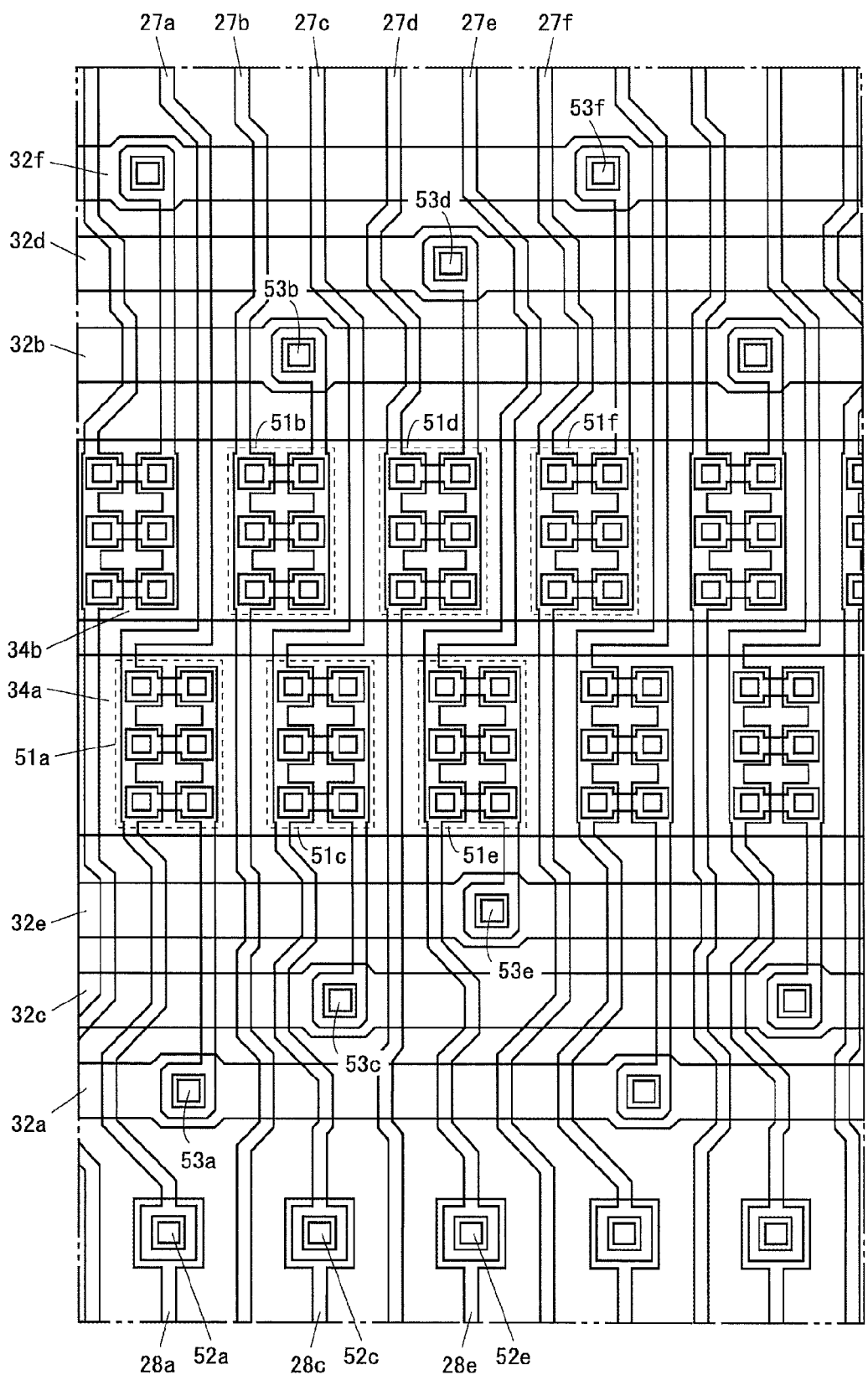
FIG. 11 is a layout view of a region for inspection and a vicinity of the region for inspection in an active matrix substrate according to a second modification of the first embodiment.

As to the active matrix substrate 10 according to the present embodiment, the following modifications in which a shape of a control line for inspection is different can be configured. In an active matrix substrate according to a first modification, as shown in FIG. 10, a control line for inspection 33 has a linear shape with cutouts, the shape corresponding to a region that includes the TFTs for inspection 51 and that does not include the gaps between the TFTs for inspection 51 inside the region for inspection 16. In an active matrix substrate according to a second modification, as shown in FIG. 11, the TFTs for inspection 51 are classified into two groups, and are arranged side by side in the row direction on a group basis. A control line for inspection 34 includes two partial wirings 34a, 34b each having a linear shape corresponding to each of the groups of the TFTs for inspection 51 inside the region for inspection 16. Note that the TFTs for inspection 51 may be classified into three or more groups, and the control line for inspection may include three or more partial wirings.

The active matrix substrates according to these modifications can exert the same effects as those in the active matrix substrate 10 according to the first embodiment. Moreover, the area of an intersection portion between each of the control lines 33, 34 and each of the lead-out lines 27 is made small, and blunting of the signals on the control lines for inspection 33, 34 and the data lines 25 can be suppressed.

(Second Embodiment)

Figure 12:
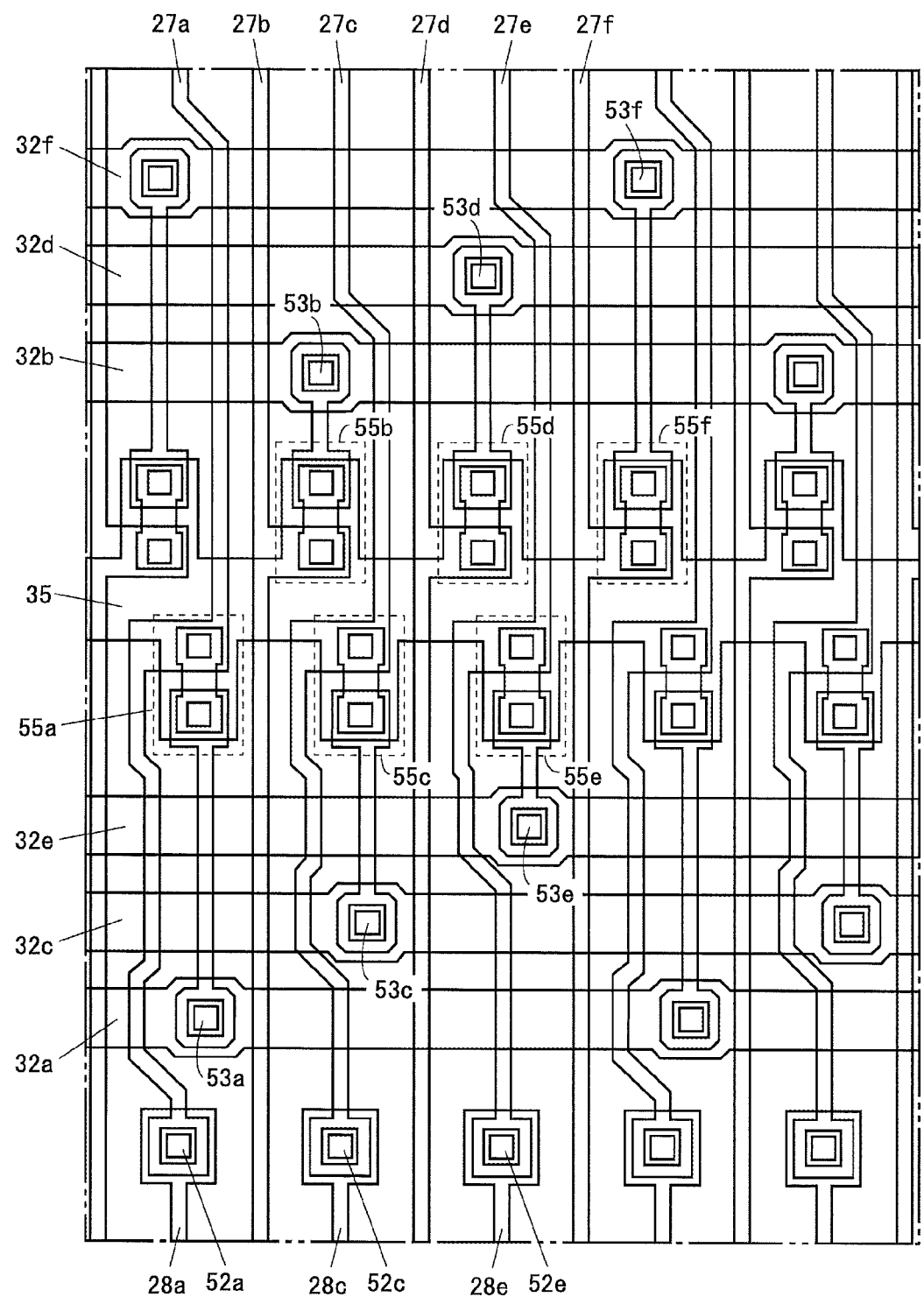
FIG. 12 is a layout view of a region for inspection and a vicinity of the region for inspection in an active matrix substrate according to a second embodiment of the present invention.
Figure 13:
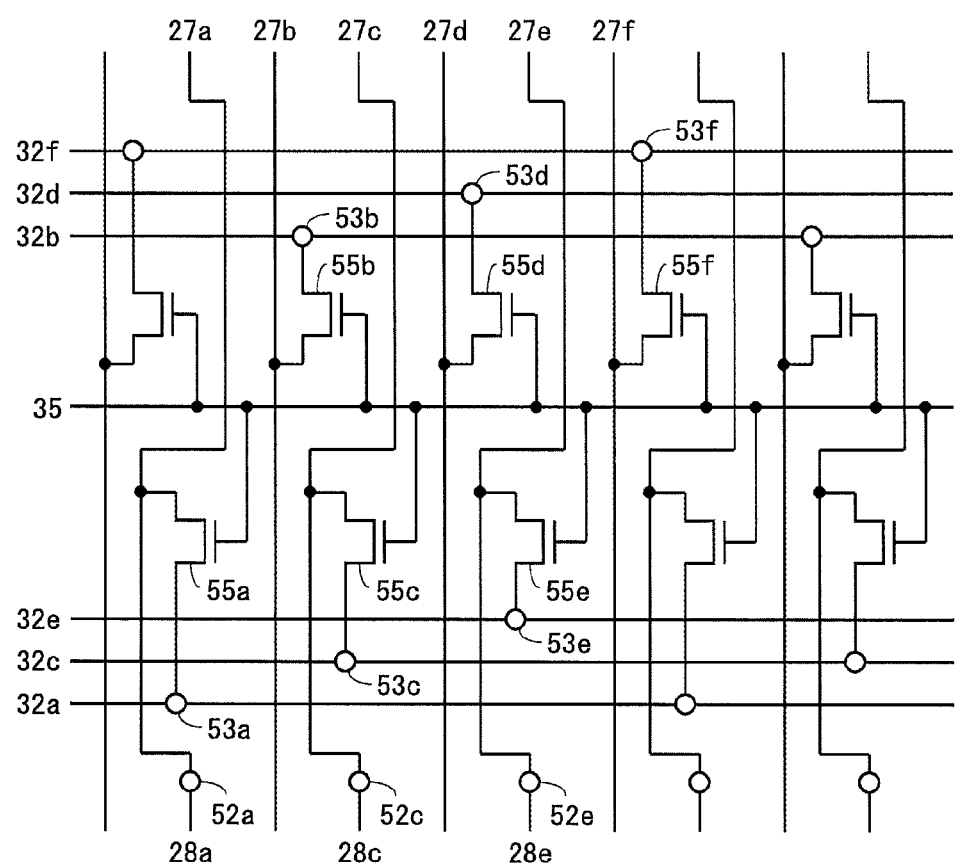
FIG. 13 is an equivalent circuit diagram of the portion shown in FIG. 12.

An active matrix substrate according to a second embodiment of the present invention is different from the active matrix substrate according to the first embodiment in a configuration of a region for inspection. FIG. 12 is a layout view of the region for inspection and a vicinity of the region for inspection in the active matrix substrate according to the present embodiment. FIG. 13 is an equivalent circuit diagram of a circuit shown in FIG. 12. Hereinafter, different points from the first embodiment will be described with reference to FIGS. 12 and 13.

In the active matrix substrate according to the present embodiment, TFTs for inspection 55 each have one gate terminal, one first conduction terminal (a terminal on the left side in FIG. 12), and one second conduction terminal. The first conduction terminal and the second conduction terminal are arranged side by side in the column direction. A control line for inspection 35 has a linear shape with cutouts, the shape corresponding to a region that includes the TFTs for inspection 55 and that does not include gaps between the TFTs for inspection 55.

In this manner, the second embodiment is different from the first embodiment in orientation of the TFTs for inspection 55, and the number of channels (the number of the gate terminals) included in each of the TFTs for inspection 55. The orientation of the TFTs for inspection 55, and the number of the channels included in each of the TFTs for inspection 55 maybe determined in any manner in view of a size of the active matrix substrate, a size of a picture-frame region, the number of data lines, a wiring load of the data lines, and a size of the TFTs for inspection which is determined in accordance with mobility of the TFTs for inspection, and the like. For example, the number of the channels included in each of the TFTs for inspection 55 may be two, or four or more.

The active matrix substrate according to the present embodiment can exert the same effects as those in the active matrix substrate 10 according to the first embodiment. Moreover, the area of an intersection portion between the control line for inspection 35 and each of the lead-out lines 27 is made small, and blunting of signals on the control line for inspection 35 and the data lines 25 can be suppressed.

(Third Embodiment)

Figure 14:
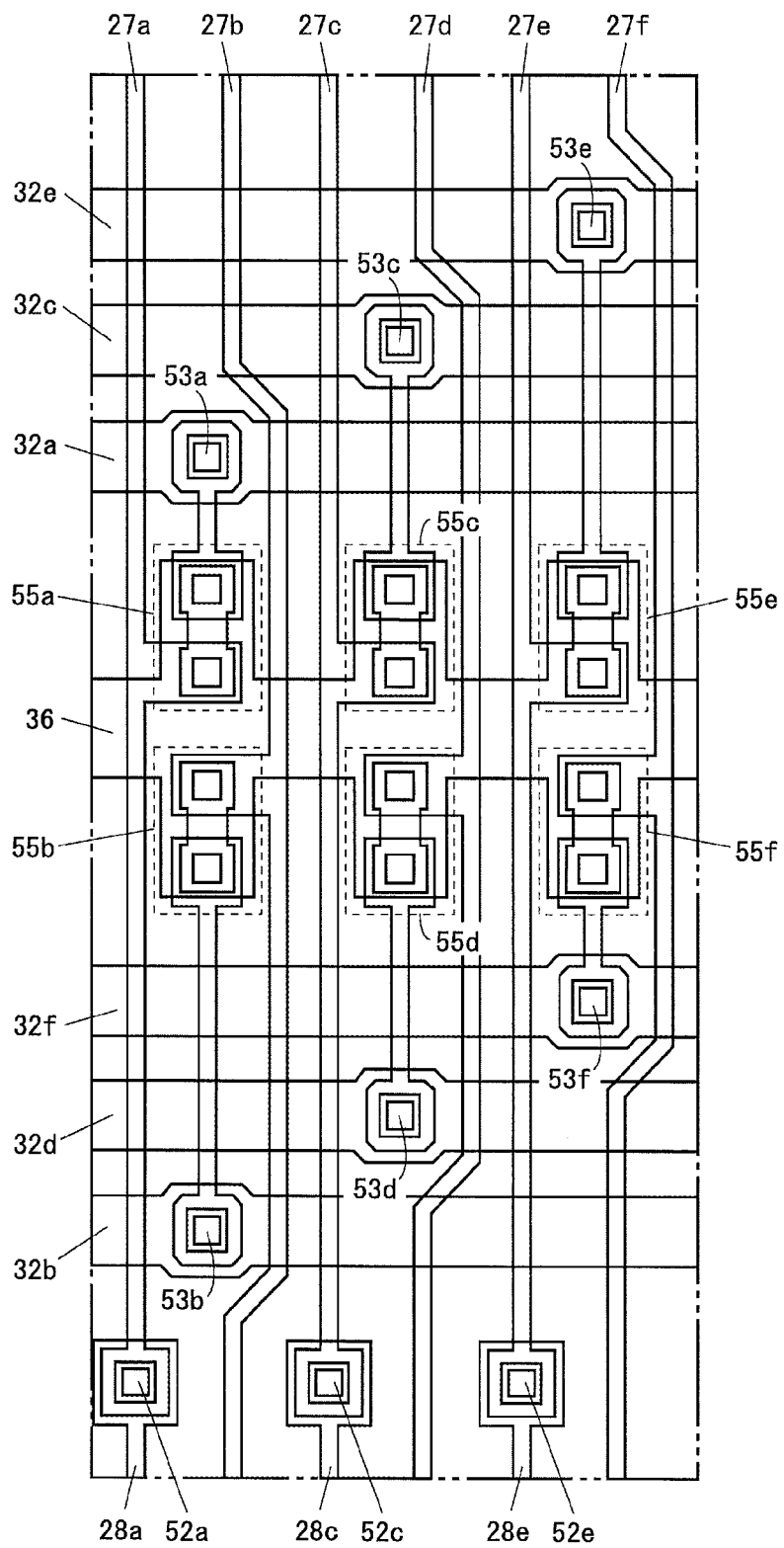
FIG. 14 is a layout view of a region for inspection and a vicinity of the region for inspection in an active matrix substrate according to a third embodiment of the present invention.
Figure 15:
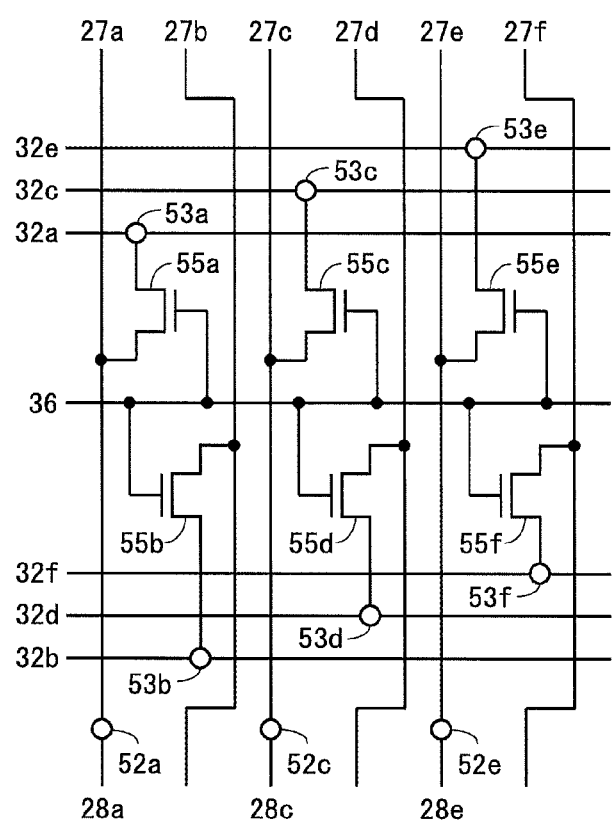
FIG. 15 is an equivalent circuit diagram of the portion shown in FIG. 14.

An active matrix substrate according to a third embodiment of the present invention is different from the active matrix substrates according to the first and second embodiments in a configuration of a region for inspection. FIG. 14 is a layout view of the region for inspection and a vicinity of the region for inspection in the active matrix substrate according to the present embodiment. FIG. 15 is an equivalent circuit diagram of a circuit shown in FIG. 14. Hereinafter, different points from the first and second embodiments will be described with reference to FIGS. 14 and 15.

In the active matrix substrate according to the present embodiment, signal lines for inspection 32a, 32c, 32e are arranged on one side (an upper side in FIG. 14) of a control line for inspection 36 inside a region for inspection 16. The signal lines for inspection 32b, 32d, 32f are arranged on the other side (a lower side in FIG. 14) of the control line for inspection 36 inside the region for inspection 16. In the vicinity of intersections between lead-out lines 27a to 27f and the control line for inspection 36, TFTs for inspection 55a to 55f are formed, respectively.

The TFTs for inspection 55a, 55c, 55e are arranged on one side (a right side in FIG. 14) of the lead-out lines 27a, 27c, 27e, respectively. The TFTs for inspection 55b, 55d, 55f are arranged on the other side (a left side in FIG. 14) of the lead-out lines 27b, 27d, 27f, respectively. In this manner, the TFTs for inspection 55a to 55f are alternately arranged on the one side and on the other side of the lead-out lines 27a to 27f connected to the TFTs for inspection 55a to 55f. A case where the two TFTs for inspection 55 are arranged between the two adjacent lead-out lines 27 and a case where none of the TFTs for inspection 55 is arranged appear alternately.

The active matrix substrate according to the present embodiment can exert the same effects as those of the active matrix substrate 10 according to the first embodiment. Moreover, the area of an intersection portion between the control line for inspection 36 and each of the lead-out lines 27 is made small, and blunting of the signals on the control line for inspection 36 and the data lines 25 can be suppressed. Moreover, in the layout shown in FIG. 14, the number of times of bending of the lead-out lines 27 inside the region for inspection 16 decreases as compared with the layout shown in FIG. 12. Therefore, according to the active matrix substrate according to the present embodiment, the favorable layout inside the region for inspection 16 decreases the number of times of bending of the lead-out lines 27 inside the region for inspection 16, and can suppress a disconnection of the lead-out lines 27 or a leakage current.

(Fourth Embodiment)

Figure 16:
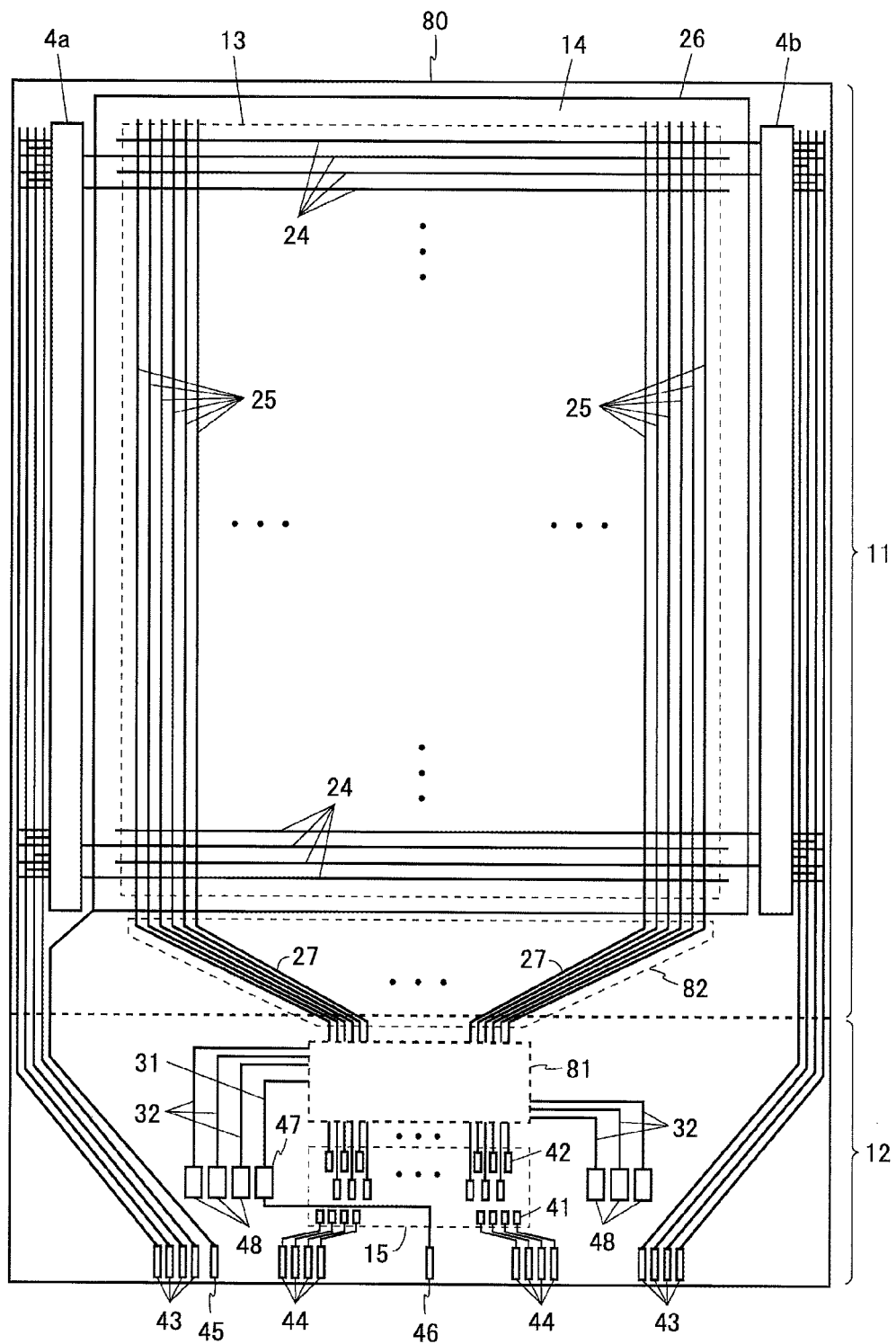
FIG. 16 is a plan view of an active matrix substrate according to a fourth embodiment of the present invention.

FIG. 16 is a plan view of an active matrix substrate according to a fourth embodiment of the present invention. Hereinafter, different points from the first to third embodiments will be described with reference to FIG. 16. As shown in FIG. 16, in an active matrix substrate 80 according to the present embodiment, a region for inspection 81 is set inside a non-counter region 12. A fan-out region 82 is set between a display region 13 and the region for inspection 81, and lead-out lines 27 are laid out in a fan shape inside the fan-out region 82.

A control line for inspection 31 and signal lines for inspection 32 are formed in a first wiring layer as with scanning lines 24. In the present embodiment, the whole of the lead-out lines 27 are formed in a second wiring layer as with the data lines 25. For this reason, no contact 52 is formed at the point X1 (refer to FIG. 4) of each of the lead-out lines 27.

The region for inspection 81 is light-shielded by a light shielding member (not shown). For example, an additional metal film covering the region for inspection 81 may be provided in the active matrix substrate 80, or the region for inspection 81 of the active matrix substrate 80 maybe covered with a resin, a tape or the like having light shielding properties. Alternatively, when a liquid crystal display device including the active matrix substrate 80 is configured, the region for inspection 81 may be covered with a bezel or the like.

In the active matrix substrate 80 according to the present embodiment, the control line for inspection 31 and the signal lines for inspection 32 are formed in the same wiring layer as the scanning lines 24, and the lead-out lines 27 are formed in the same wiring layer as the data lines 25. Accordingly, the active matrix substrate in which the lead-out lines 27 are formed in the same wiring layer as the data lines 25 can exert the same effects as those in the first embodiment.

Moreover, the lead-out lines 27 are arranged in a fan shape in the fan-out region 82 set between the display region 13 and the region for inspection 81. Accordingly, the active matrix substrate 80 having the fan-out region 82 between the display region 13 and the region for inspection 81 can exert the same effects as those in the first embodiment. Moreover, since a disconnection or a short circuit inside the fan-out region 82 can be detected, an inspection accuracy of the active matrix substrate 80 can be enhanced.

Moreover, the region for inspection 81 is set outside a counter region 11, and the active matrix substrate 80 further includes the light shielding member that light-shields the region for inspection 81. When the region for inspection 81 is set outside the counter region 11 in this manner, TFTs for inspection 51 can be light-shielded by using the light shielding member, and malfunction of the TFTs for inspection 51 can be prevented.

Figure 17:
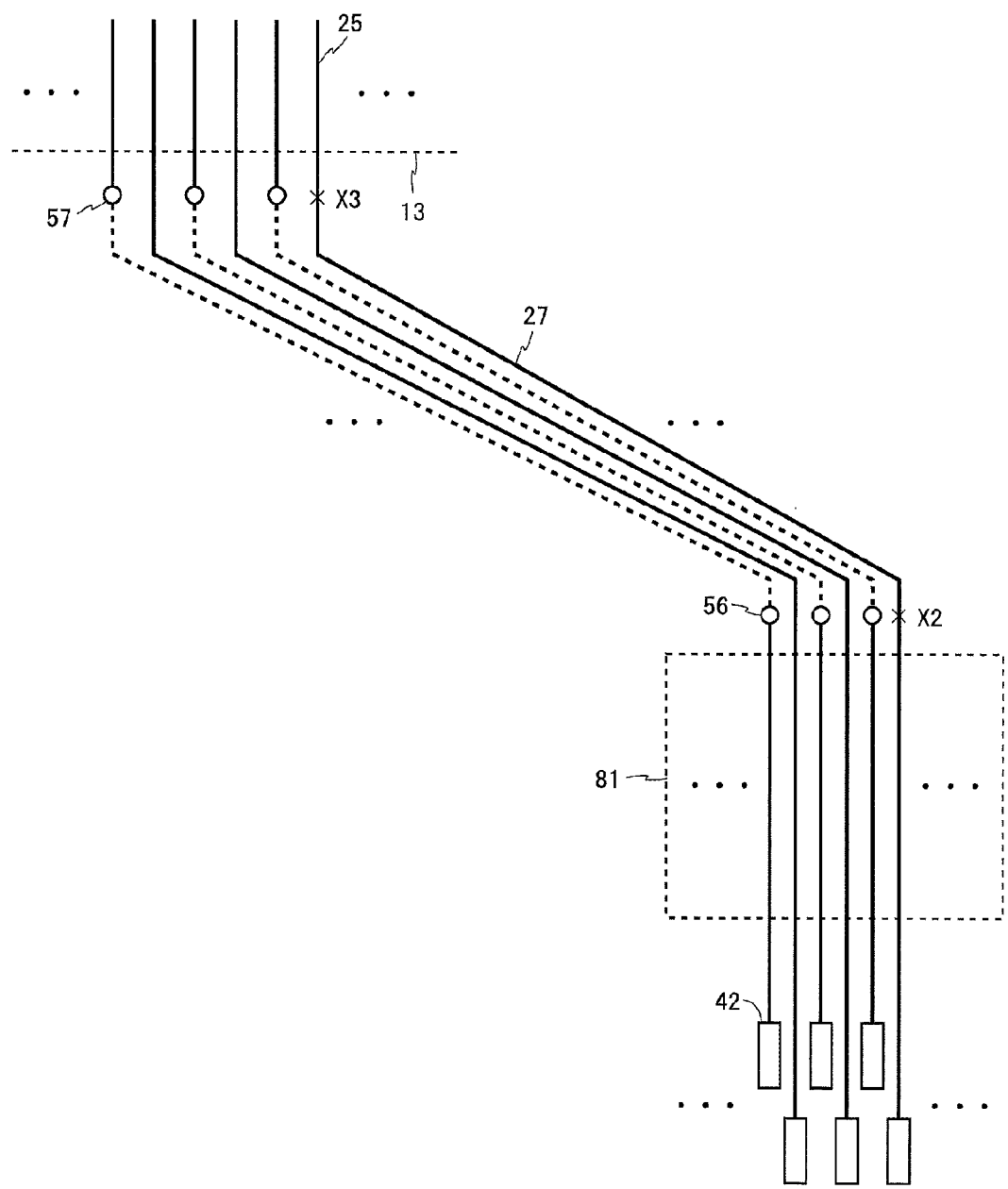
FIG. 17 is a view showing lead-out lines of an active matrix substrate according to a modification of the fourth embodiment.

As to the active matrix substrate 80 according to the present embodiment, a modification can be configured in which portions of the lead-out lines 27 are formed alternately in the first wiring layer and the second wiring layer in arrangement order. FIG. 17 is a view showing the lead-out lines of the active matrix substrate according to the modification of the fourth embodiment. When a point X2 is set between the region for inspection 81 and a bending point on a first end side (a terminal end 42 side) of each of the lead-out lines 27, and a point X3 is set between the display region 13 and a bending point on a second end side of the lead-out line 27, the lead-out line 27 is divided into a first portion from the first end to the point X2, a second portion from the point X2 to the point X3, and a third portion from the point X3 to the second end.

The first portions and the third portions of the lead-out lines 27 are formed in the second wiring layer as with the data lines 25, and the second portions of the lead-out lines 27 are alternately formed in the first wiring layer and the second wiring layer in the arrangement order. For example, the second portions of the odd-numbered lead-out lines 27 are formed in the first wiring layer, and the second portions of the even-numbered lead-out lines 27 are formed in the second wiring layer. When the second portions of the lead-out lines 27 are formed in the first wiring layer, contacts 56 each connecting the first portion and the second portion are formed at positions of the points X2 of the lead-out lines 27, and contacts 57 each connecting the second portion and the third portion are formed at positions of the points X3 of the lead-out lines 27.

According to the active matrix substrate according to the present modification, the active matrix substrate in which the fan-out region 82 is provided between the display region 13 and the region for inspection 81 and in which the lead-out lines 27 are alternately formed in the two wiring layers inside the fan-out region 82 can exert the same effect as those in the fourth embodiment.

As to the active matrix substrate according to each of the first to fourth embodiments of the present invention, various modifications can be configured. The active matrix substrate may include pixel circuits corresponding to four or more basic colors. For example, the active matrix substrate may include white pixel circuits corresponding to white or pixel circuits corresponding to yellow in addition to the three types of pixel circuits corresponding to red, green, and blue (four-color configuration). Alternately, the active matrix substrate may include both the pixel circuits corresponding to yellow and pixel circuits corresponding to cyan in addition to the three types of pixel circuits corresponding to red, green, and blue (five-color configuration). In the active matrix substrate having the four-color configuration, eight signal lines for inspection are provided. Four of the eight signal lines for inspection are arranged on one side of the control line for inspection inside the region for inspection, and the remaining four are arranged on the other side of the control line for inspection inside the region for inspection. In the active matrix substrate having five-color configuration, ten signal lines for inspection are provided. Five of the ten signal lines for inspection are arranged on the one side of the control line for inspection inside the region for inspection, and the remaining five are arranged on the other side of the control line for inspection inside the region for inspection.

Moreover, while the case where the pixel circuits of one color are connected to each of the data lines is described above, the pixel circuits of a plurality of colors may be connected to each of the data lines. For example, in the case where the pixel circuits are alternately provided on a right side and a left side of the data lines, the pixel circuits of the two colors are connected to each of the data lines.

Moreover, a liquid crystal display device similar to that in the first embodiment can be configured by using the active matrix substrate according to each of the second to fourth embodiments and the modifications of each embodiment. Moreover, the features of the respective embodiments are combined in any manner as long as the combinations are not against the nature of each feature, and an active matrix substrate and a liquid crystal display device having the features of the plurality of embodiments can be configured. For example, in the active matrix substrate according to the fourth embodiment, the configuration of the region for inspection 81 may have a form shown in any of FIGS. 5, 10, 11, 12, and 14.

Moreover, the control line for inspection, the signal lines for inspection, the TFTs for inspection, and the terminals for inspection as described above can also be used in applications other than inspection. These elements can also be used, for example, as a channel for supplying signals used when a PSA (Polymer Sustained Alignment) technique is carried out, or as a channel for removing electric charges electrified in the pixel electrodes and the like inside the display region in a manufacturing process.

The PSA technique means a technique in which, for example, in a vertical alignment mode in which a liquid crystal having a negative dielectric anisotropy is sandwiched between the active matrix substrate and the counter substrate, an alignment sustaining layer that gives a pretilt to the liquid crystal when no voltage is applied is formed, in order to regulate an alignment direction of liquid crystal molecules when no voltage is applied. The alignment sustaining layer is formed on a vertical alignment film as a polymer layer by photopolymerizing a photopolymerizable monomer or an oligomer mixed beforehand in a liquid crystal material, typically in a state where a voltage is applied to a liquid crystal layer, when liquid crystal cells are formed. By the alignment sustaining layer, the liquid crystal when no voltage is applied can maintain (store) a pretilt angle and the alignment orientation in a direction slightly tilted (for example, at 2° to 3°) from a direction perpendicular to a substrate surface of the active matrix substrate. This can improve a response speed of the liquid crystal alignment when a voltage is applied. Moreover, a time required for returning from a state where the alignment is disturbed to a normal state when a surface of the liquid crystal panel is pushed with a finger can be shortened.

When the PSA technique is carried out, as in the inspection of the liquid crystal panel, a predetermined voltage is applied to the counter electrode or the auxiliary capacitance wiring, and a control signal is supplied to the scanning line drive circuit, and thus an ON voltage is applied to the scanning lines. In addition, the ON voltage is applied to the terminals for inspection connected to the control line for inspection, and a voltage for carrying out the PSA technique is applied to the terminals for inspection connected to the signal lines for inspection.

INDUSTRIAL APPLICABILITY

Since the active matrix substrate of the present invention has such a feature that a disconnection, a leakage current, and a luminance unevenness of the screen for inspection can be suppressed, the active matrix substrate of the present invention can be utilized for a substrate of various types of display devices including a liquid crystal display device, and the like. Since the display device of the present invention has a feature of high reliability, the display device of the present invention can be utilized for a display part of various types of electronic equipment, and the like.

DESCRIPTION OF REFERENCE CHARACTERS

1: LIQUID CRYSTAL DISPLAY DEVICE
2: LIQUID CRYSTAL PANEL
3: DISPLAY CONTROL CIRCUIT
4: SCANNING LINE DRIVE CIRCUIT
5: DATA LINE DRIVE CIRCUIT
6: BACKLIGHT
7: COUNTER SUBSTRATE
10, 80: ACTIVE MATRIX SUBSTRATE
11: COUNTER REGION
12: NON-COUNTER REGION
13: DISPLAY REGION
14: PICTURE-FRAME REGION
15: MOUNTING REGION
16, 81: REGION FOR INSPECTION
17, 18, 82: FAN-OUT REGION
21: PIXEL CIRCUIT
24: SCANNING LINE
25: DATA LINE
27: LEAD-OUT LINE
28: FIRST PORTION
29: SECOND PORTION
31, 33, 34, 35, 36: CONTROL LINE FOR INSPECTION
32: SIGNAL LINE FOR INSPECTION
47, 48: TERMINAL FOR INSPECTION
51, 55: TFT FOR INSPECTION
52, 53, 56, 57: CONTACT
54: DIODE

The invention claimed is:

1. An active matrix substrate comprising:
a plurality of pixel circuits arranged two-dimensionally inside a display region;
a plurality of scanning lines extending in a first direction inside the display region;
a plurality of data lines extending in a second direction inside the display region;
a plurality of lead-out lines that is connected to the data line and that passes in the second direction through an inside of a circuit region set outside the display region;
a control line extending in the first direction inside the circuit region;
a plurality of signal lines extending in the first direction inside the circuit region; and
a plurality of switching elements that is arranged inside the circuit region, and that controls a conduction state between the lead-out line and the signal line corresponding to the lead-out line in accordance with a signal on the control line, wherein
the plurality of signal lines includes a first signal line arranged on one side of the control line inside the circuit region, and a second signal line arranged on other side of the control line inside the circuit region, and
one of the two adjacent lead-out lines is connected to the first signal line via the switching element, and the other is connected to the second signal line via the switching element.

2. The active matrix substrate according to claim 1, wherein
the control line and the signal lines are formed in same wiring layer as the scanning lines,
the lead-out line connected to the second signal line via the switching element is formed in same wiring layer as the data lines, and
the lead-out line connected to the first signal line via the switching element has a portion formed in the same wiring layer as the scanning lines, and a portion formed in the same wiring layer as the data lines, and is formed in the same wiring layer as the data lines inside the circuit region.

3. The active matrix substrate according to claim 2, wherein
the lead-out lines are arranged in a fan shape in a fan-out region set on an opposite side of the display region with the circuit region interposed, and
the lead-out line connected to the first signal line via the switching element is formed in the same wiring layer as the scanning lines inside the fan-out region.

4. The active matrix substrate according to claim 2, wherein
the lead-out lines are arranged in a fan shape in a fan-out region set between the display region and the circuit region, and
the lead-out line connected to the first signal line via the switching element is formed in the same wiring layer as the scanning lines inside the fan-out region.

5. The active matrix substrate according to claim 1, wherein
the control line and the signal lines are formed in same wiring layer as the scanning lines, and
the lead-out lines are formed in same wiring layer as the data lines.

6. The active matrix substrate according to claim 5, wherein the lead-out lines are arranged in a fan shape in a fan-out region set between the display region and the circuit region.

7. The active matrix substrate according to claim 1, wherein a number of the first signal lines and a number of the second signal lines are each equal to a number of basic colors assigned to the pixel circuits.

8. The active matrix substrate according to claim 1, wherein
the first signal line intersects with one side extending in the second direction of the circuit region, and
the second signal line intersects with another side extending in the second direction of the circuit region.

9. The active matrix substrate according to claim 1, wherein the switching elements are formed at positions overlapping the control line.

10. The active matrix substrate according to claim 9, wherein the control line has a linear shape corresponding to a region including the switching elements and gaps between the switching elements inside the circuit region.

11. The active matrix substrate according to claim 9, wherein the control line has a linear shape with cutouts, the shape corresponding to a region that includes the switching elements and that does not include gaps between the switching elements inside the circuit region.

12. The active matrix substrate according to claim 9, wherein
the switching elements are classified into a plurality of groups, and are arranged side by side in the first direction on a group basis, and
the control line includes a plurality of partial wirings each having a linear shape corresponding to each of the groups of the switching elements inside the circuit region.

13. The active matrix substrate according to claim 1, wherein the switching elements are alternately arranged on one side and on other side of the lead-out lines connected to the switching elements.

14. The active matrix substrate according to claim 1, wherein the circuit region is set inside a counter region.

15. The active matrix substrate according to claim 1, wherein
the circuit region is set outside a counter region, and
the active matrix substrate further includes a light shielding member that light-shields the circuit region.

16. A display device comprising:
the active matrix substrate according to claim 1; and
a counter substrate opposed to the active matrix substrate.

* * * * *